US012591630B2

(12) United States Patent
Baldua et al.

(10) Patent No.: US 12,591,630 B2
(45) Date of Patent: Mar. 31, 2026

(54) WEB SEARCH RESULTS LEVERAGING PUBLIC RESOURCES AVAILABLE TO ENTERPRISE USERS

(71) Applicant: Microsoft Technology Licensing, LLC, Redmond, WA (US)

(72) Inventors: Tanay Sanjay Baldua, Redmond, WA (US); Tanvir Nasser Nagore, Redmond, WA (US); Ankit Rastogi, Redmond, WA (US); Aryaan Aditya Singh, Redmond, WA (US); Sagar Dilip Puranik, Redmond, WA (US); Narayanan Subramanian, Redmond, WA (US); Anusha Palavally Battineni, Redmond, WA (US); Hima Shankar Durga Amarnath Chavata, Redmond, WA (US); Manish Kumar Gaurav, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 18/573,290

(22) PCT Filed: May 13, 2022

(86) PCT No.: PCT/US2022/029088
§ 371 (c)(1),
(2) Date: Dec. 21, 2023

(87) PCT Pub. No.: WO2022/271296
PCT Pub. Date: Dec. 29, 2022

(65) Prior Publication Data
US 2024/0289403 A1     Aug. 29, 2024

(30) Foreign Application Priority Data
Jun. 22, 2021     (IN) ............................ 202141027984

(51) Int. Cl.
*G06F 17/00* (2019.01)
*G06F 16/2457* (2019.01)
(Continued)

(52) U.S. Cl.
CPC ...... *G06F 16/954* (2019.01); *G06F 16/24575* (2019.01); *G06F 16/955* (2019.01)

(58) Field of Classification Search
CPC . G06F 16/954; G06F 16/24575; G06F 16/955
See application file for complete search history.

(56) References Cited

U.S. PATENT DOCUMENTS

| | | | | |
|---|---|---|---|---|
| 7,370,276 B2 * | 5/2008 | Willis | ................... | G06F 16/954 |
| | | | | 715/744 |
| 8,706,717 B2 * | 4/2014 | Rajasekhar | ......... | G06F 3/04842 |
| | | | | 707/723 |

(Continued)

FOREIGN PATENT DOCUMENTS

WO     WO-2011090945 A1 *  7/2011  ......... G06F 16/9535

OTHER PUBLICATIONS

"Take your library to your patrons", accessed on link https://leanlibrary.com/, retrieved on Jul. 15, 2024, 9 pages.
(Continued)

*Primary Examiner* — Laurie A Ries
(74) *Attorney, Agent, or Firm* — Ray Quinney & Nebeker P.C.; Paul N. Taylor

(57) ABSTRACT

The present disclosure relates to systems, devices, and methods for integrating enterprise assets with a web experience of enterprise users. The systems, devices, and methods may receive a query from an enterprise user and may provide the query to a search engine. The systems, devices, and methods may receive search results and may enrich the search results with one or more enterprise assets related to the search results. The systems, devices, and methods may
(Continued)

present a search webpage with the search results and the one or more enterprise assets.

21 Claims, 13 Drawing Sheets

(51) Int. Cl.
  *G06F 16/954* (2019.01)
  *G06F 16/955* (2019.01)

(56) References Cited

U.S. PATENT DOCUMENTS

| | | | | |
|---|---|---|---|---|
| 9,384,263 | B2 * | 7/2016 | Radhakrishnan | G06F 16/245 |
| 9,418,114 | B1 * | 8/2016 | Mengle | G06F 16/2457 |
| 10,157,232 | B2 * | 12/2018 | Dai | H04L 67/306 |
| 10,176,232 | B2 * | 1/2019 | Coll | G06F 16/248 |
| 10,534,783 | B1 * | 1/2020 | Raczko | G06F 3/04817 |
| 11,797,595 | B2 * | 10/2023 | Hartlaub | G06F 16/437 |
| 12,375,968 | B2 * | 7/2025 | Orhan | H04W 28/021 |
| 2007/0067297 | A1 * | 3/2007 | Kublickis | G06Q 30/02 |
| | | | | 707/999.009 |
| 2008/0243787 | A1 * | 10/2008 | Stading | G06F 16/951 |
| 2010/0094859 | A1 * | 4/2010 | Gupta | G06F 16/9562 |
| | | | | 715/745 |
| 2010/0153862 | A1 | 6/2010 | Schreiber | |
| 2011/0208822 | A1 * | 8/2011 | Rathod | G06Q 30/02 |
| | | | | 709/206 |
| 2012/0233209 | A1 * | 9/2012 | Cheng | G06F 16/22 |
| | | | | 707/770 |
| 2013/0238583 | A1 * | 9/2013 | Lehmann | G06F 16/9538 |
| | | | | 707/706 |
| 2013/0311459 | A1 * | 11/2013 | Koide | G06F 16/90335 |
| | | | | 707/723 |
| 2014/0067788 | A1 * | 3/2014 | Williams | H04M 3/5231 |
| | | | | 707/711 |
| 2015/0234925 | A1 * | 8/2015 | Vijayaraghavan | |
| | | | | G06F 16/9538 |
| | | | | 707/706 |
| 2015/0294357 | A1 * | 10/2015 | Anjum | G06Q 30/0256 |
| | | | | 705/14.54 |
| 2016/0086193 | A1 * | 3/2016 | Hulaj | G06Q 30/0609 |
| | | | | 705/317 |
| 2016/0292279 | A1 * | 10/2016 | Murphy | G06F 16/9535 |
| 2017/0255627 | A1 * | 9/2017 | Coll | G06F 16/248 |
| 2019/0259107 | A1 * | 8/2019 | Hollis | H04L 65/403 |
| 2020/0050623 | A1 * | 2/2020 | Hartlaub | G06F 16/437 |
| 2020/0218726 | A1 * | 7/2020 | Chimalamarri | G06F 16/24578 |
| 2023/0252324 | A1 * | 8/2023 | Matlick | H04L 61/5007 |
| | | | | 706/12 |
| 2024/0281410 | A1 * | 8/2024 | Williams | G06F 16/122 |

OTHER PUBLICATIONS

International Search Report and Written Opinion received for PCT Application No. PCT/US2022/029088, Aug. 12, 2022, 13 pages.

* cited by examiner

602

600

604

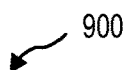
900

```
┌─────────────────────────────────────────────────────────┐
│   Receiving enterprise offers available from third parties │──── 902
└─────────────────────────────────────────────────────────┘
                            │
                            ▼
┌─────────────────────────────────────────────────────────┐
│   Receiving enriched information for the enterprise offers │──── 904
└─────────────────────────────────────────────────────────┘
                            │
                            ▼
┌─────────────────────────────────────────────────────────┐
│       Receiving an enterprise ID and a third party ID     │──── 906
└─────────────────────────────────────────────────────────┘
                            │
                            ▼
┌─────────────────────────────────────────────────────────┐
│   Mapping the enterprise ID and the available enterprise offers │──── 908
└─────────────────────────────────────────────────────────┘
                            │
                            ▼
┌─────────────────────────────────────────────────────────┐
│  Storing the mappings between the enterprise ID and the enterprise │──── 910
│                          offers                           │
└─────────────────────────────────────────────────────────┘
                            │
                            ▼
┌─────────────────────────────────────────────────────────┐
│                 Receiving a query for a topic             │──── 912
└─────────────────────────────────────────────────────────┘
                            │
                            ▼
┌─────────────────────────────────────────────────────────┐
│  Performing a check to verify if the enterprise ID has any mappings │──── 914
│                    to enterprise offers                   │
└─────────────────────────────────────────────────────────┘
                            │
                            ▼
┌─────────────────────────────────────────────────────────┐
│     Receiving a confirmation with the enterprise offers   │──── 916
└─────────────────────────────────────────────────────────┘
                            │
                            ▼
┌─────────────────────────────────────────────────────────┐
│      Providing ranked results of the enterprise offers    │──── 918
└─────────────────────────────────────────────────────────┘
```

FIG. 9

1102
1100
Microsoft Bing    🔍 laptop deals
1104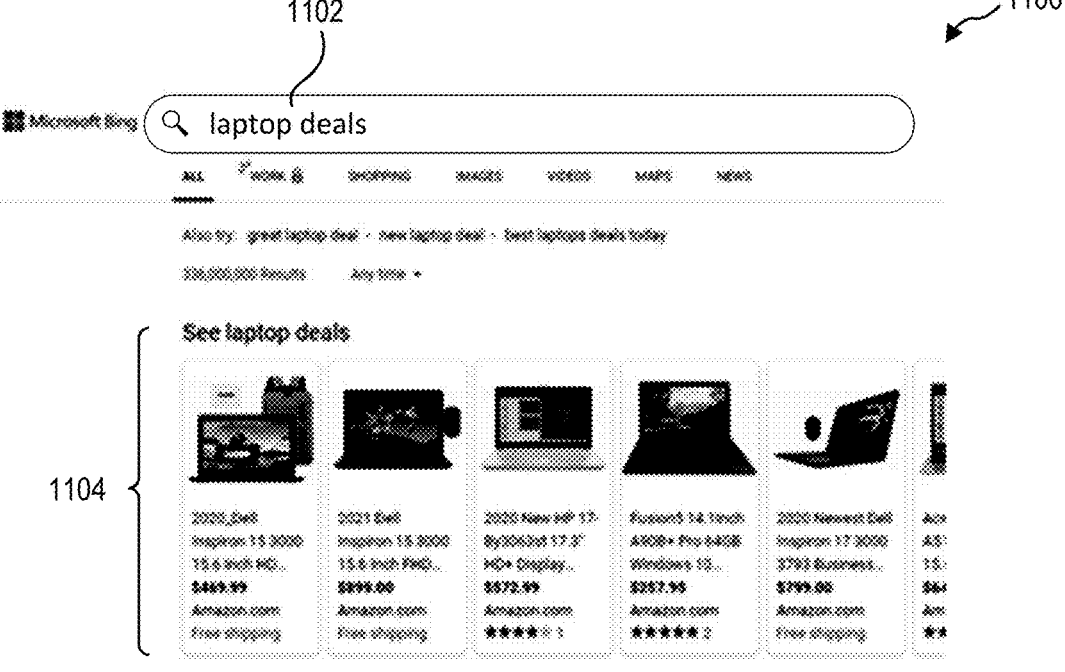
1106
Laptop Deals | Shop Now & Save At Best Buy®
https://www.bestbuy.com/weekly/deals ▾
HP® Laptop Security | Guard Your Privacy | Learn More
https://www8.hp.com ▾
Shop Laptops At Staples | Fast Free Staples® Shipping
https://www.staples.com/intel ▾
1108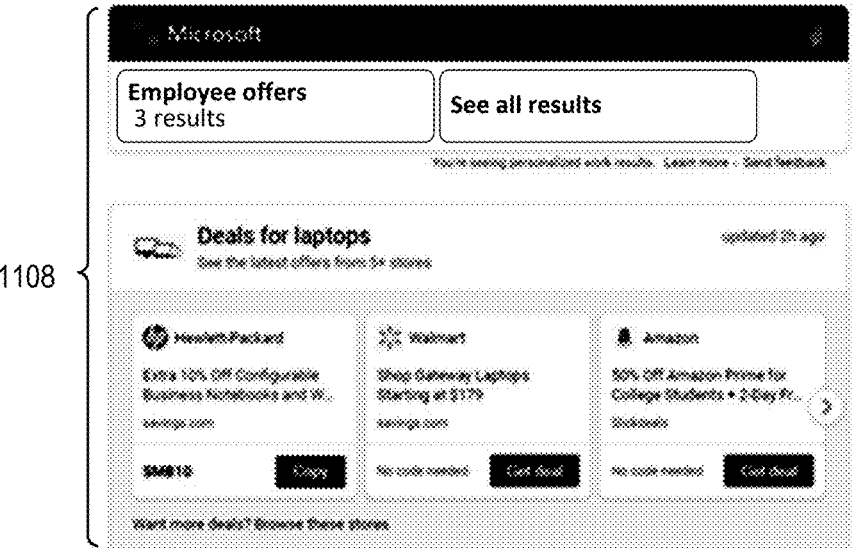
FIG. 11

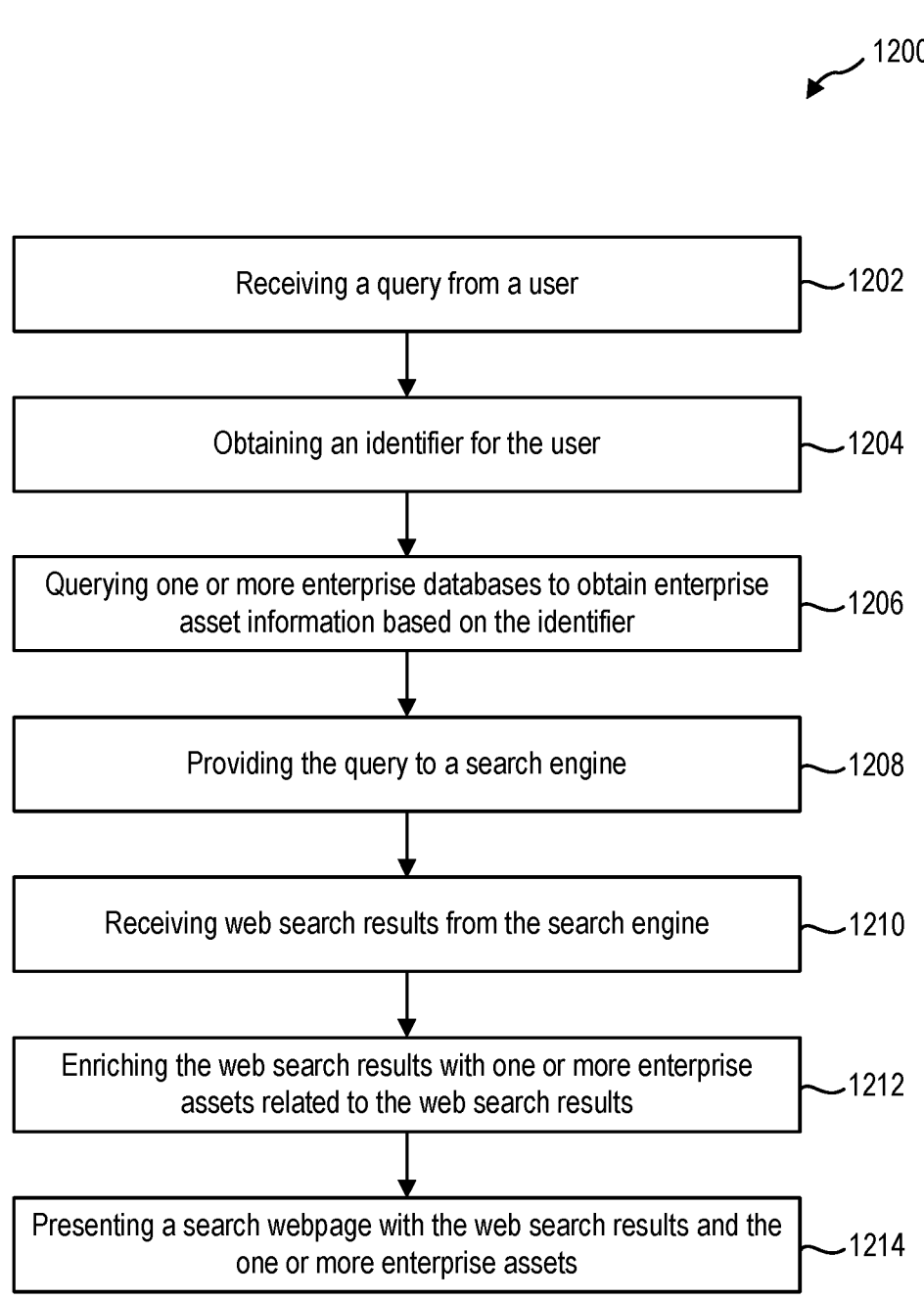

1200

Receiving a query from a user ~1202

Obtaining an identifier for the user ~1204

Querying one or more enterprise databases to obtain enterprise asset information based on the identifier ~1206

Providing the query to a search engine ~1208

Receiving web search results from the search engine ~1210

Enriching the web search results with one or more enterprise assets related to the web search results ~1212

Presenting a search webpage with the web search results and the one or more enterprise assets ~1214

FIG. 12

WEB SEARCH RESULTS LEVERAGING PUBLIC RESOURCES AVAILABLE TO ENTERPRISE USERS

BACKGROUND

Most enterprise users today are unaware of the enterprise assets made available from their organization. Enterprise assets may include perks, benefits, subscriptions, offers, public discussion forums, and/or public groups. Enterprise users currently rely on word of mouth, mailers, and/or broadcast messages from their organizations to become aware of the enterprise assets available to them as an employee. Enterprise users generally do not discover the enterprise assets available in the natural flow of searching using a search engine. Moreover, most enterprise users are unaware of how to access the enterprise assets available to the enterprise users.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method for presenting enterprise assets with search results on a display of a device. The method includes receiving a query from a user. The method includes obtaining an identifier for the user. The method includes querying one or more enterprise databases to obtain enterprise asset information based on the identifier. The method includes providing the query to a search engine. The method includes responsive to providing the query, receiving search results from the search engine. The method includes enriching the search results with one or more enterprise assets related to the search results. The method includes presenting on the display a search webpage with the search results and the one or more enterprise assets.

Another example implementation relates to a method for presenting enterprise offers with search results on a display of a device. The method includes receiving a query from a user. The method includes obtaining an identifier for the enterprise. The method includes querying one or more enterprise databases to obtain enterprise offers information based on the identifier. The method includes providing the query to a search engine. The method includes responsive to providing the query, receiving search results. The method includes identifying one or more enterprise offers related to the search results. The method includes presenting on the display a search webpage with the search results and the one or more enterprise offers.

Another example implementation relates to a device. The device may include one or more processors; memory in electronic communication with the one or more processors; and instructions stored in the memory, the instructions executable by the one or more processors to: receive a query from a user; obtain an identifier for the user; query one or more enterprise databases to obtain enterprise asset information based on the identifier; provide the query to a search engine; responsive to providing the query, receive search results from the search engine; enrich the search results with one or more enterprise assets related to the search results; and present on a search webpage the search results and the one or more enterprise assets.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 9 illustrates an example method for identifying enterprise offers related to search results in accordance with implementations of the present disclosure.

FIG. 11 illustrates an example graphical user interface of a webpage displaying search results and enterprise offers in accordance with implementations of the present disclosure.

FIG. 12 illustrates an example method for presenting enterprise assets with search results in accordance with implementations of the present disclosure.

DETAILED DESCRIPTION

Figure 1:
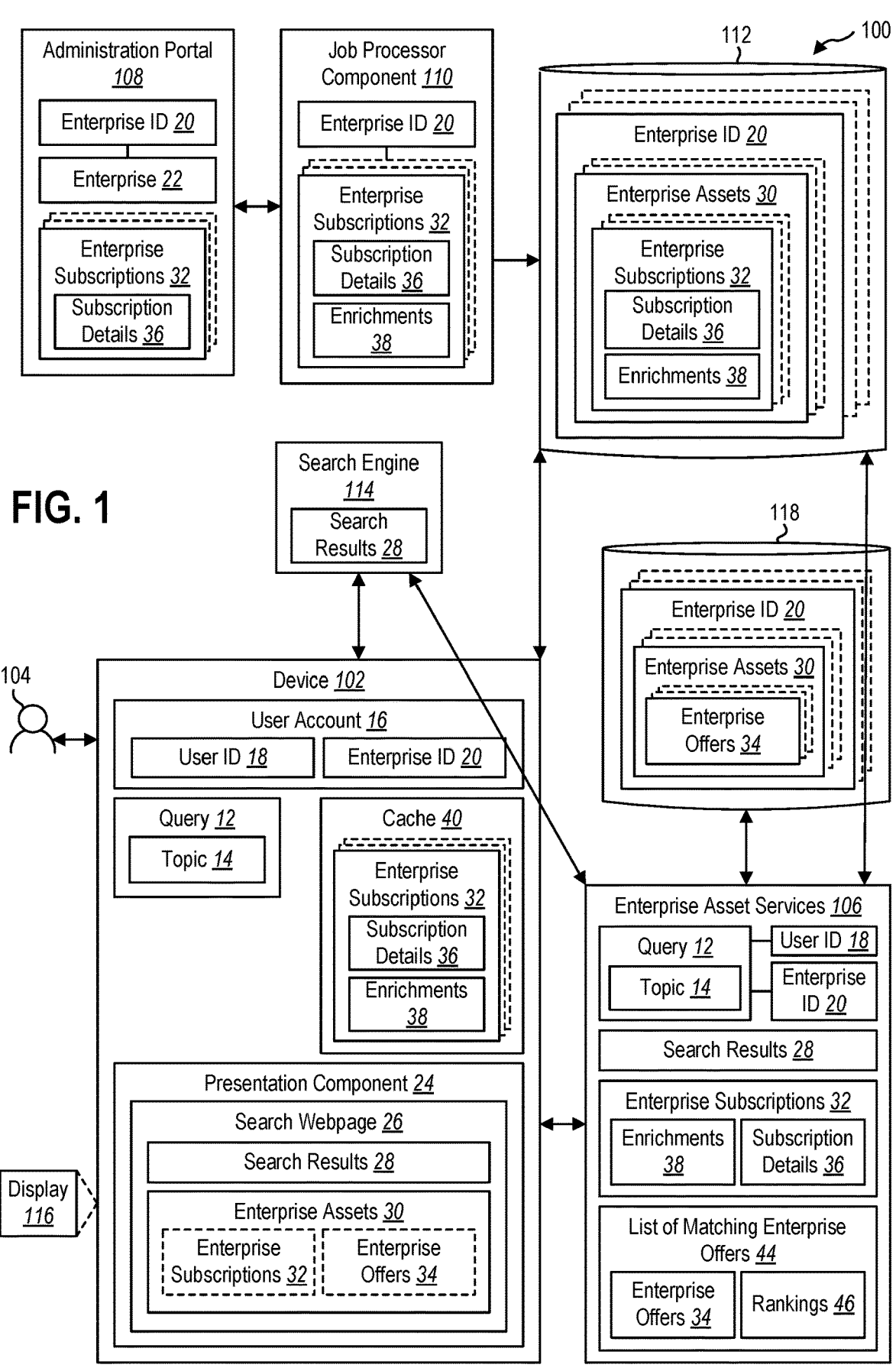
FIG. 1 illustrates an example environment for integrating enterprise assets with a web experience in accordance with implementations of the present disclosure.

This disclosure generally relates to integrating enterprise assets with an enterprise user's web experience. Enterprise users researching on a topic or catching up on news generally get paywalled at major research databases or news websites. Most enterprise users do not use their enterprise subscriptions adequately. Moreover, most enterprise users today are unaware of the enterprise assets made available from their organization. Enterprise assets may include perks, benefits, subscriptions, offers, public discussion forums, and/or public discussion groups. Enterprise users currently rely on word of mouth, mailers, and/or broadcast messages from their organizations to become aware of the enterprise assets available to them as an employee. As such, enterprise users typically miss using available offers or discounts provided by their organization as the enterprise users either forget about the offers or discounts, cannot recall the offers or discounts, or do not want to access another portal or page for the information about the offers or discounts.

Enterprise users generally do not discover the enterprise assets available in the natural flow of searching using a search engine. Moreover, most enterprise users are unaware of how to access the enterprise assets available.

Currently, enterprise users may have a browser plugin that may provide information about available subscriptions. However, the users must access the browser plugin to identify what subscriptions may be available for use for the users. Moreover, the browser plugin does not provide discovering and obtaining access to these resources in the natural flow of the users searching on the web.

The present disclosure provides methods and systems that highlight to the enterprise user the relevant domains that organizations have subscriptions to through a web experience. Enterprise users may include users that have an association with an organization or company (e.g., employees or members). Subscriptions may include, but are not limited to, books, news publications, Journals, software, etc. Web experiences may include, but are not limited to, providing queries in a search engine, browsing web pages, and/or accessing articles or videos on the internet.

The present disclosure may automatically identify available enterprise assets for the enterprise and may present the available enterprise assets available in an overlay on the webpage, helping the enterprise users discover sources of information faster, and thereby, improving productivity. An example use case includes an employee who searches for the book "Hit Refresh" using a search engine on a work computer, the employee is notified about the availability of the book within the enterprise's library. Another example use case includes an employee surfing through the web for a news article using a work account and the employee is notified about the enterprise subscription to the Wall Street Journal and may access the locked news article for free. As such, the present disclosure highlights when domains from the search results have available enterprise subscriptions.

The methods and systems also highlight to the enterprise user relevant offers available from the enterprise assets that may be related to the enterprise user's search results. An example use case includes an enterprise user searching for "flower shops" in a search engine to send a bouquet of flowers. In the context of the query for "flower shops," the methods and systems surface any relevant deals available because of the enterprise user's employment with the organization. The methods and systems integrate with third party providers and build a ranking and trigger engine that caters to a respective enterprise or organization.

One technical advantage of some implementations of the present disclosure is improving web search results by identifying and searching the private enterprise database in addition to the public search engine databases.

Referring now to FIG. 1, illustrated is an example environment 100 for integrating enterprise assets 30 with a web experience of enterprise users 104. The environment 100 may include one or more devices 102 used by the enterprise users 104 for the web experiences. The enterprise users 104 may be employees of an enterprise 22 (e.g., a company or organization), members of the enterprise 22, or otherwise affiliated with the enterprise 22. Enterprise assets 30 may include, but are not limited to, enterprise subscriptions 32, enterprise offers 34, perks, benefits, public discussion forums, and/or public discussion groups that may be provided to the enterprise users 104. The web experiences may include, but are not limited to, providing queries 12 for a search engine 114, browsing webpages, and/or accessing articles or videos on the internet.

The enterprise user 104 may access the device 102 using a user account 16. The user account 16 may provide user information, such as, but not limited to, the user identification (ID) 18, any security groups that the enterprise user 104 may be part of in the enterprise 22, and/or the enterprise identification (ID) 20 for the enterprise 22. The enterprise user 104 may use the device 102 to enter queries 12 for searching different topics 14. For example, the enterprise user 104 may enter the queries 12 on a search webpage 26 presented on a display 116 in communication with the device 102. The enterprise users 104 may provide text or other inputs for the queries 12.

The device 102 may provide the queries 12 for the topics 14 to a search engine 114 via a network. The network may include one or multiple networks that use one or more communication platforms or technologies for transmitting data. For example, the network may include the internet or other data link that enables transport of electronic data between respective devices of the environment 100.

The search engine 114 may execute the queries 12 against one or more datastores with a plurality of webpages to obtain search results 28 for the queries 12. For example, the search results 28 may include one or more webpages and corresponding uniform resource locator (URL)s that relate to the topics 14. The search engine 114 may provide the search results 28 to the device 102 for presentation on the display 116.

In addition, the search engine 114 may provide the search results 28 to an enterprise asset service 106 in communication with the search results 28 and the device 102. The device 102 may also provide the query 12 for the topic 14 to the enterprise asset service 106. The query 12 may be associated with the user ID 18 of the enterprise user 104 and the enterprise ID 20 of the enterprise user 104. The user ID 18 and the enterprise ID 20 may be obtained from the user account 16.

The enterprise asset service 106 may identify one or more enterprise assets 30 related to the search results 28 and may provide the one or more enterprise assets 30 to the device 102 for presentation on the display 116. The device 102 may include a presentation component 24 that may display the search webpage 26 with the search results 28 and the enterprise assets 30 on the display 116.

The enterprise asset service 106 may receive the enterprise assets 30 from one or more datastores 112, 118 in the environment 100. The enterprise asset service 106 may execute a request against the datastores 112, 118 to obtain the enterprise assets 30 associated with the enterprise ID 20. The datastores 112, 118 may be secure datastores that store the enterprise assets 30 for each enterprise ID 20 separately so that the enterprise assets 30 for the enterprise 22 may be inaccessible to other enterprises in the environment 100. In some implementations, the datastores 112, 118 include both the enterprise subscriptions 32 and the enterprise offers 34 as the enterprise assets 30 for the enterprise ID 20.

In some implementations, the datastore 112 stores the enterprise subscriptions 32 for the enterprise ID 20. The enterprise subscriptions 32 may include the subscription details 36 for each enterprise subscriptions 32 and any enrichments 38 added to the enterprise subscriptions 32. A job processor component 110 may populate the datastore 112 with the enterprise subscriptions 32, the subscription details 36, and the enrichments 38 for the enterprise subscriptions 32. The subscription details 36 provide the information to identify the enterprise subscription 32. For example, the subscription details 36 include, but are not limited to, subscription provider information, the subscription URL, details for accessing the subscription, URL matching scheme enumeration (domain information, host information, complete URL), any access restrictions (security group (SG) access), and/or any additional sign-in parameters.

The job processor component 110 processes the subscription details 36 and provides the enrichments 38 for the subscription details 36. The enrichments 38 may include a GUID for the incremental data. The enrichments 38 may also include metadata based on the access restrictions for the enterprise subscription 32. Each enterprise subscription 32 may have different metadata.

The metadata may provide information for accessing the enterprise subscription 32. For example, one set of metadata is shown to one security group indicating full access to the enterprise subscription 32 (e.g., the sales group has full access to the enterprise subscription), and a different set of metadata is shown to another security group indicating partial access to the enterprise subscription 32 (e.g., the accounting group has partial access to the enterprise subscription). The enrichments 38 may also include a processed URL to match based on the URL matching scheme for the enterprise subscription 32. For example, if any of the domain, host, or the complete URL for the subscription details 36 matches a search result 28 of the enterprise user 104, the subscription details 36 are presented to the enterprise user 104.

The job processor component 110 may receive the enterprise subscriptions 32 and the subscription details 36 for the enterprise 22 from an administration portal 108. The administration portal 108 manages the subscription details 36 for each enterprise subscription 32 of the enterprise 22. In some implementations, the job processor component 110 may automatically discover the enterprise assets 30 available from the enterprise 22. For example, the job processor component 110 may mine or otherwise discover the enterprise assets 30 (e.g., the enterprise subscriptions 32 and/or the enterprise offers 34) from internal sites at the enterprise 22. The job processor component 110 sends the enterprise subscriptions 32, the subscription details 36, and the enrichments 38 for the enterprise subscriptions 32 to the datastore 112.

In some implementations, the datastore 118 stores the enterprise offers 34 for the enterprise ID 20. The enterprise offers 34 may include discounts from third party providers for the enterprise 22. The enterprise 22 may partner with a plurality of third party providers for the enterprise offers 34. In addition, the third parties may provide different enterprise offers 34 to different enterprises 22. As such, the datastore 118 may store the available enterprise offers 34 for each enterprise ID 20.

The enterprise asset service 106 may receive the enterprise subscriptions 32 with the subscription details 36 and the enrichments 38 for the enterprise ID 20 associated with the query 12. The enterprise asset service 106 may filter the subscription details 36 to ensure that the enterprise user 104 has access to the enterprise subscriptions 32. One example of filtering performed by the enterprise asset service 106 includes comparing the security groups (SGs) and/or domain levels (DLs) of the enterprise user 104 to the access permissions included in the subscription details 36 for each enterprise subscription 32.

The enterprise asset service 106 may separate the enterprise subscriptions 32 based on the filtering performed. The enterprise asset service 106 accesses the set of metadata (e.g., subscription provider, subscription URL, processed URL, URL matching scheme, and/or additional sign-in parameters) included in the enrichments 38 for all the valid enterprise subscriptions 32. The enterprise asset service 106 may separate the enterprise subscriptions 32 based on the enrichments 38 for the enterprise subscriptions 32. For example, the enterprise asset service 106 divides the enterprise subscriptions 32 under separate keys, to signify the different types of URL matching schemes, and the enterprise subscriptions 32 which fall under that URL matching scheme.

The enterprise asset service 106 sends the enterprise subscriptions 32, the subscription details 36, and the enrichments 38 for the enterprise subscriptions 32 to the browser cache 40. The browser cache 40 may store the enterprise subscriptions 32, the subscription details 36, and/or the enrichments 38 associated with the user ID 18 of the enterprise user 104. As such, different user accounts may have different information stored in the browser cache 40 for the enterprise subscriptions 32. The caching may be automatically supported by the browser 10, and additional implementation may not be needed to create, query, and/or delete the cache 40 at the browser 10. As such, the browser 10 interacting with the cache 40 will appear transparent to the processes on the browser 10. The enterprise subscriptions 32, the subscription details 36, and the enrichments 38 may remain in the cache 40 for a predetermined time (e.g., three weeks).

The enterprise asset service 106 may also receive the enterprise offers 34 available for the enterprise ID 20 associated with the query 12. The enterprise asset service 106 may determine the available enterprise offers 34 for the query 12. The enterprise asset service 106 may generate a list of matching enterprise offers 44 with enterprise offers 34 that are related to the query 12. For example, the list of matching enterprise offers 44 may be similar to the topic 14 of the query 12 or the same as the topic 14 to the query 12. The enterprise asset service 106 may also provide one or more rankings 46 for the list of matching enterprise offers 44. The rankings 46 may indicate a level of confidence of the relevance of the list of matching enterprise offers 44 to the query 12. The enterprise asset service 106 may send the list of matching enterprise offers 44 and the rankings 46 to the device 102.

The presentation component 24 may receive the search results 28 and may make a determination whether to present any enterprise assets 30 with the search results 28. For example, the presentation component 24 may access the cache 40 and determine whether any of the URLs included in the search results 28 match the URLs included in the enterprise subscription details 36. If a match occurs, the presentation component 24 may determine to decorate one or more URLs included in the search results 28 with the enterprise subscription 32. Decorating the one or more URLs may include, for example, providing information about the enterprise subscription 32 in an overlay or nearby to the URL in the search results. Another example may include the presentation component 24 determining whether the rankings 46 indicate that any of the enterprise offers 44 included in the list of matching enterprise offers 44 are related to the search results 28. If the enterprise offers 44 are related to the search results 28, the presentation component 24 may determine to present the enterprise offers 44 with search results 28.

The presentation component 24 may place the enterprise assets 30 on the search webpage 26 based on a variety of factors. Example factors include, but are not limited to, the intent of the query 12, available content from local businesses, available advertisements, and/or the relevance of the enterprise assets 30 to the query. The presentation component 24 may use the variety of factors in determining whether to collapse the enterprise assets 30 (e.g., providing limited information about the enterprise assets 30), expand the enterprise assets 30 by providing more information. In addition, the presentation component 24 may use the variety of factors in determining whether to place the enterprise assets 30 higher or lower in the search webpage 26. The enterprise assets 30 may have visually distinct display attributes (e.g., different border, different shading, overlays).

The presentation component 24 may provide access to the one or more enterprise assets 30. For example, the enterprise user 104 may click on the enterprise offer 34 that appears as a carousel in the search webpage 26 and the selected offer may open directly. As such, the enterprise user 104 may not miss any relevant deals if something matches with the query 12. Another example may include the presentation component 24 redirecting the enterprise user 104 to another page with information for accessing the enterprise assets 30.

As such, the search webpage 26 may present the search results 28 for the query along with one or more enterprise assets 30 highlighted related to the search results 28 so that the enterprise user 104 may easily identify the available enterprise assets 30. For example, the enterprise assets 30 may include any enterprise subscriptions 32 related to the search results 28 and/or any enterprise offers 34 related to the search results 28.

In some implementations, the environment 100 may log information relating to presenting the enterprise assets 30, such as, any latency identified for serving the search results 28 with the enterprise assets 30, and/or any errors that may have occurred in the environment 100. The environment 100 may use the logs to improve the webpage performance.

In some implementations, one or more computing devices (e.g., servers and/or devices) are used to perform the processing of environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the enterprise asset service 106, the job processor component 110, the search engine 114, and/or the datastores 112, 118 are implemented wholly on the same computing device. Another example includes one or more subcomponents of the enterprise asset service 106, the job processor component 110, the search engine 114, and/or the datastores 112, 118 implemented across multiple computing devices. Moreover, in some implementations, the enterprise asset service 106, the job processor component 110, the search engine 114, and/or the datastores 112, 118 are implemented or processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular embodiment. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

As such, the environment 100 may be used to enrich web search results 28 with one or more enterprise assets 30 that are available to the enterprise user 104 through an association with the enterprise 22.

Figure 2:
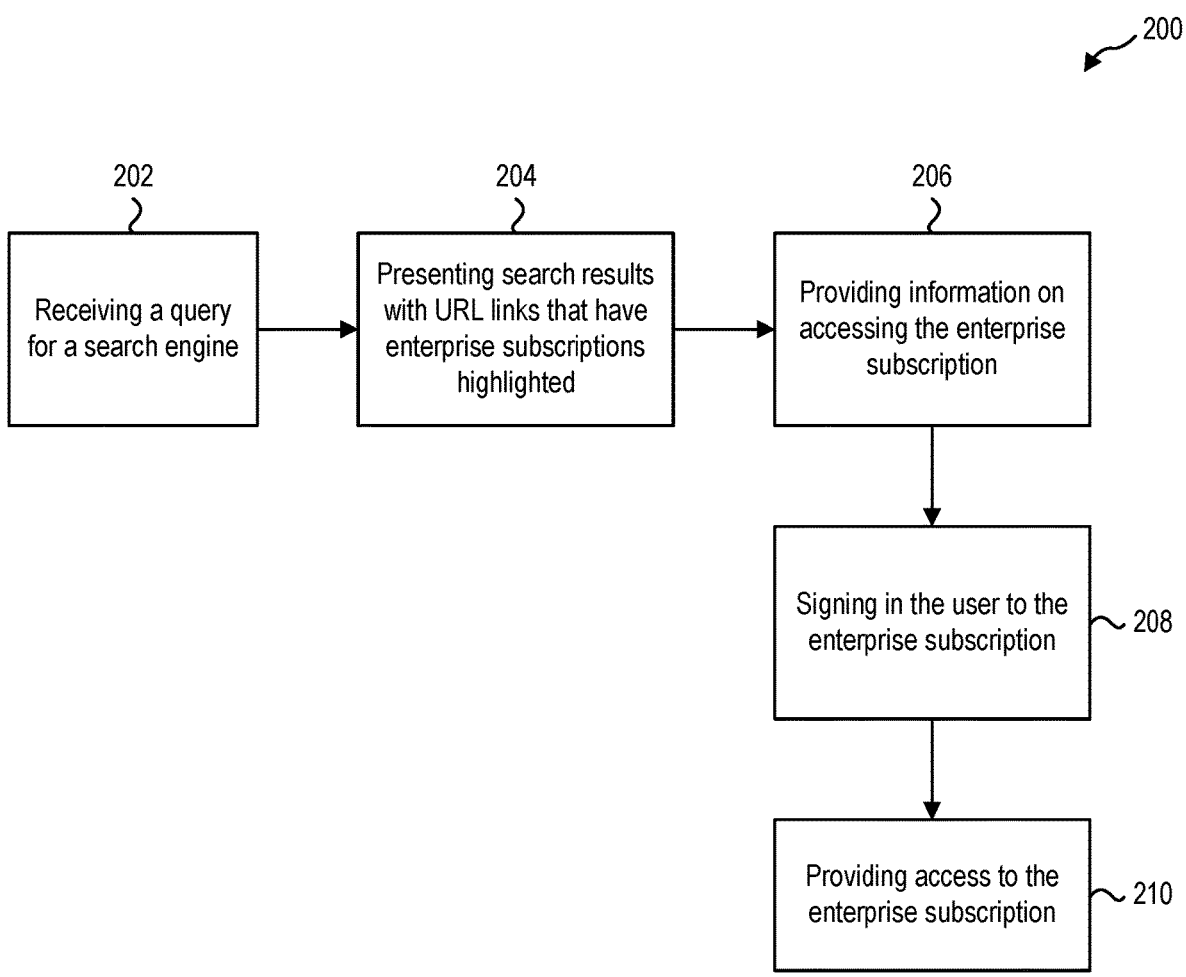
FIG. 2 illustrates an example method for presenting enterprise subscriptions related to a query in accordance with implementations of the present disclosure.

Referring now to FIG. 2, illustrated is an example method 200 for presenting enterprise subscriptions 32 related to search results 28 for a query 12. The method 200 may be performed by a browser 10. The actions of the method 200 are discussed below in reference to the architecture of FIG. 1.

At 202, the method 200 includes receiving a query 12 for a search engine 114. The enterprise user 104 may perform one or more searches or queries 12 using the browser 10 of device 102. For example, the enterprise user 104 may be logged into the device 102 through a work account.

At 204, the method 200 includes presenting the search results 28 with URL links that have enterprise subscriptions 32 highlighted. For example, the presentation component 24 may present decorations or other overlays on the search webpage 26 that visually distinguish the enterprise subscriptions 32 from the URL links included in the search results 28. The decorations or over overlays may easily highlight that an enterprise subscription 32 is available to the enterprise user 104.

At 206, the method 200 includes providing information on accessing the enterprise subscription 32. The presentation component 24 may present additional information, for example, in an overlay with details for accessing the enterprise subscription 32. In some implementations, the browser 10 may redirect the enterprise user 104 to a login page or other access page for the enterprise subscription 32.

At 208, the method 200 includes signing in the enterprise user 104 to the enterprise subscription 32. The browser 10 may automatically request access or gain access to the enterprise subscription 32 for the enterprise user 104. For example, the browser 10 uses the user account 16 (e.g., a work account) of the enterprise user 104 to automatically sign into the enterprise subscription 32. As such, a single sign on mechanism may be used to automatically login the enterprise user 104 into the enterprise subscription 32 using the user account 16. In some implementations, the enterprise user 104 may take additional steps to receive access to the enterprise subscription 32 (e.g., register a new account, request access by providing a username and password).

At 210, the method 200 includes providing access to the enterprise subscription 32. The browser 10 may provide access to the enterprise subscription 32 so that the enterprise user 104 may use the enterprise subscription 32 to access additional resources related to the query 12. For example, the enterprise user 104 may access journal articles related to the query 12 using the enterprise subscription 32.

As such, the method 200 may be used to highlight to enterprise users 104 available enterprise subscriptions 32 related to a query 12 performed by the enterprise users 104.

Figure 3:
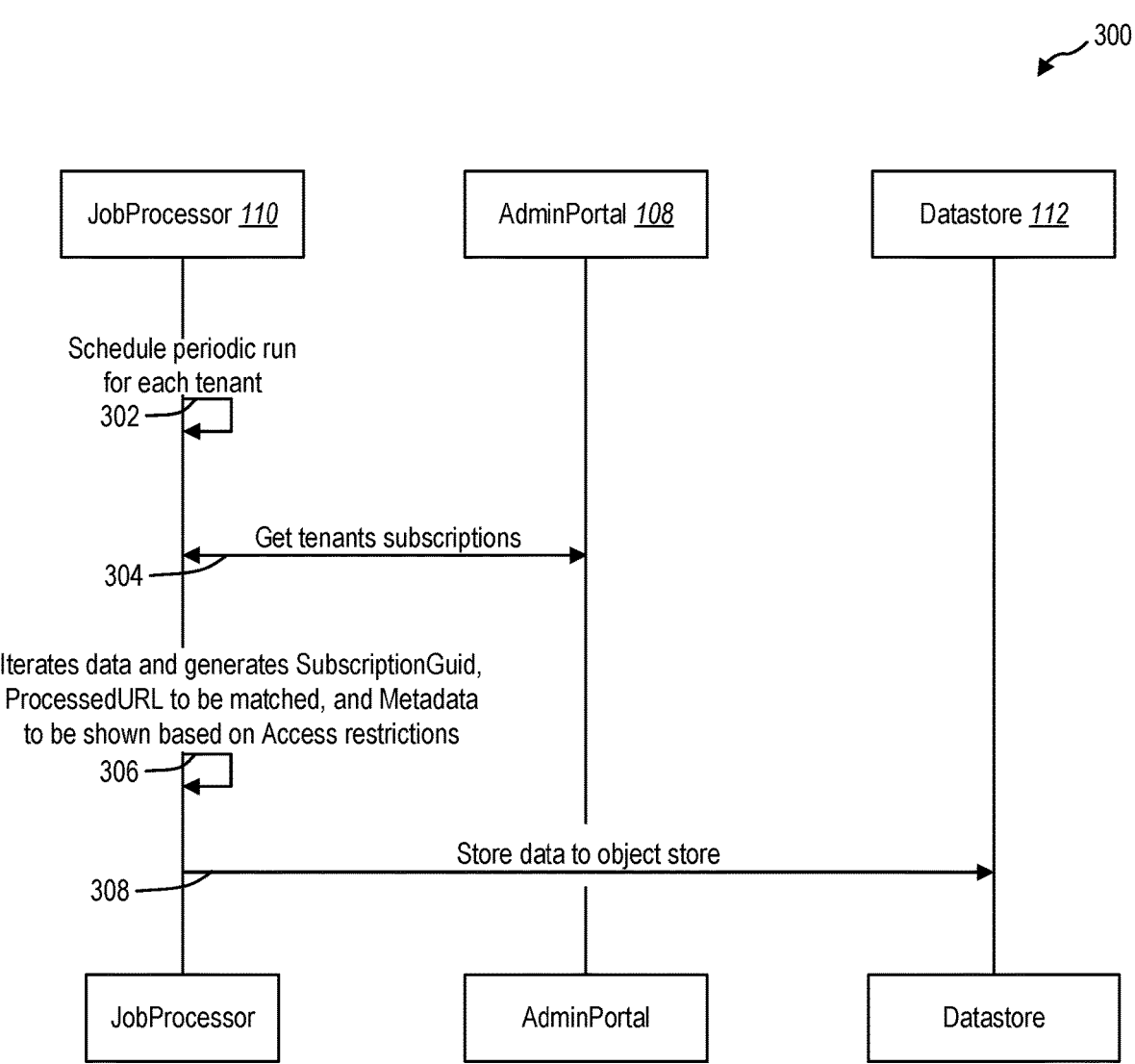
FIG. 3 illustrates an example method for enterprise subscriptions processing in accordance with implementations of the present disclosure.

Referring now to FIG. 3, illustrated is an example method 300 for enterprise subscription 32 processing. The method 300 is performed by a job processor component 110 in communication with an administration portal 108 and a datastore 112. The actions of the method 300 are discussed below in reference to the architecture of FIG. 1.

At 302, the job processor component 110 schedules a periodic check for each enterprise 22 to determine the available enterprise subscriptions 32. The periodic check may occur on any interval (e.g., daily, weekly, monthly, etc.).

At 304, the job processor component 110 requests the enterprise subscriptions 32 for the enterprise 22. In some implementations, the enterprise subscriptions 32 are situated at the administration portal of the enterprise 22 and the administration portal 108 manages the subscription details 36 for each enterprise subscription 32 of the enterprise 22. In some implementations, the enterprise subscriptions 32 are situated at one or more enterprise databases (e.g., datastores 112, 118). The subscription details 36 provide the information to identify the enterprise subscription 32. For example, the subscription details 36 include, but are not limited to, subscription provider information, the subscription URL, details for accessing the subscription, URL matching scheme enumeration (domain information, host information, complete URL), any access restrictions (security group (SG) access), and/or any additional sign-in parameters.

At 306, the job processor component 110 processes the subscription details 36 and provides enrichments 38 for the subscription details 36. An example enrichment 38 includes the job processor component 110 generating a GUID for the incremental data. Another example enrichment 38 includes the job processor component 110 generating metadata to present based on the access restrictions for the enterprise subscription 32. Each enterprise subscription 32 may have different metadata. The metadata may provide information for accessing the enterprise subscription 32. For example, one set of metadata is shown to one security group indicating full access to the enterprise subscription 32 (e.g., the sales group has full access to the enterprise subscription), and a different set of metadata is shown to another security group indicating partial access to the enterprise subscription 32 (e.g., the accounting group has partial access to the enterprise subscription). Another example enrichment 38 is a processed URL. The job processor component 110 also stores the processed URL to match based on the URL matching scheme. For example, if any of the domain, host, or complete URL for the subscription details 36 matches a search result of the user, the subscription details 36 are presented to the enterprise user 104.

At 308, the job processor component 110 sends the subscription details 36 and any enrichments 38 for the subscription details 36 for storage in the datastore 112. The datastore 112 stores the subscription details 36 and the enrichments 38 for each enterprise 22 in a secure manner to ensure unauthorized access to the subscription details 36 for the enterprise 22.

As such, method 300 may be used to retrieve the enterprise subscriptions 32 for the enterprise 22 and capture any changes or modifications to the available enterprise subscriptions 32 for the enterprise 22.

Figure 4:
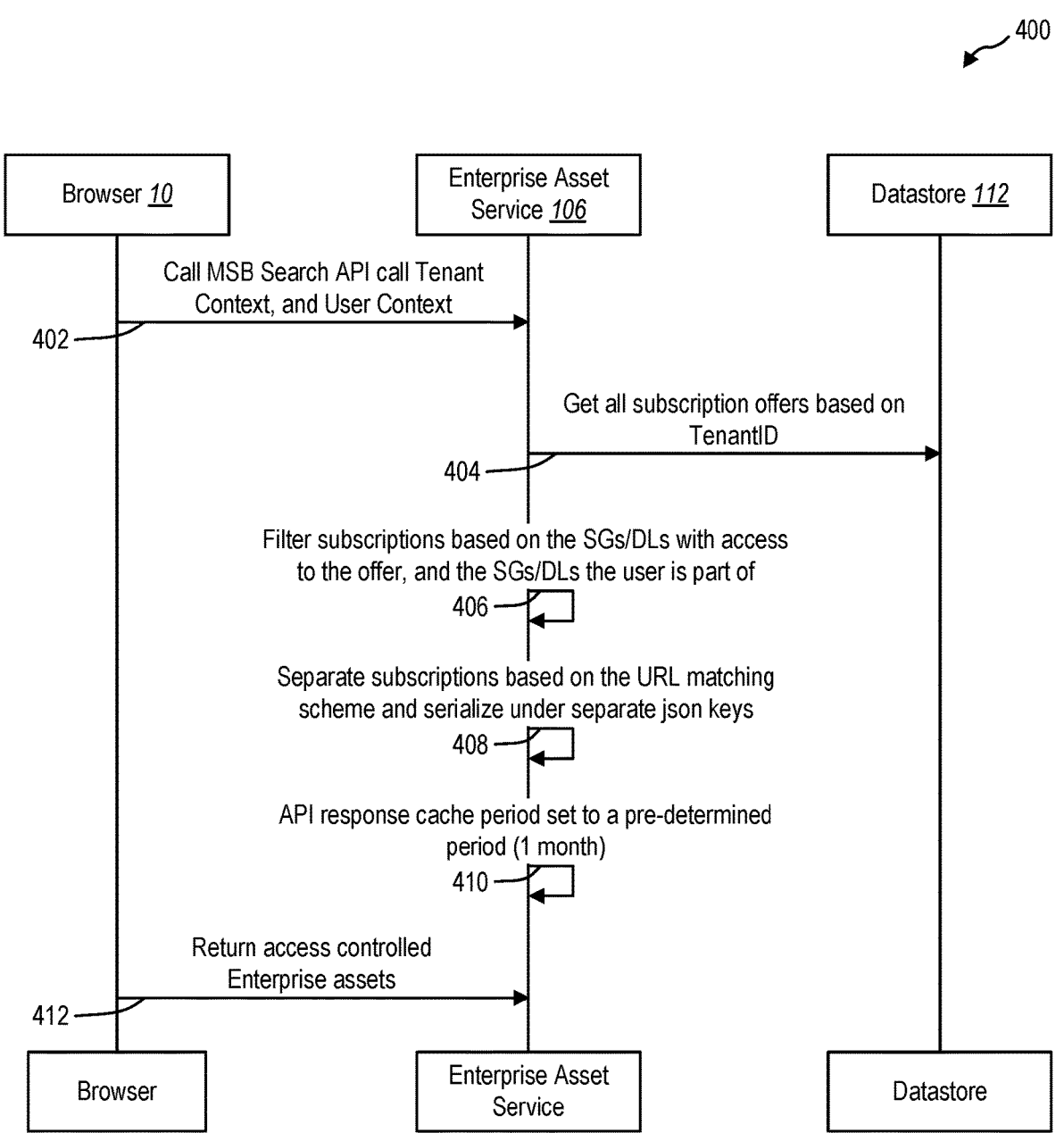
FIG. 4 illustrates an example method for identifying enterprise subscriptions to present with web search results in accordance with implementations of the present disclosure.

Referring now to FIG. 4, illustrated is an example method 400 for identifying enterprise subscriptions 32 to present with web search results 28. The method 400 may be performed by the enterprise asset service 106. The actions of method 400 may be discussed below in reference to the architecture of FIG. 1.

At 402, the enterprise assets service 106 receives a query 12 with the enterprise context and the user context from the browser 10. The enterprise context includes an enterprise ID 20 for the enterprise 22 of the enterprise user 104 that made the query 12. The enterprise ID 20 may automatically be identified based on a user account 16 of the enterprise user 104. The user account may identify any security groups, domain levels, or other access permissions for the enterprise user 104. For example, the enterprise user 104 is logged into an enterprise account and performs the query 12 using the enterprise account. The user context may include any security groups or domain levels that the user belongs to in the enterprise 22. For example, the user may belong to a management security group because the user is part of the management team at the enterprise 22.

At 404, the enterprise asset service 106 retrieves from the datastore 112 the subscription details 36 and any enrichments 38 for the enterprise 22. The corpus of enterprise subscriptions 32 is filtered and retrieved from the datastore 112 based on the enterprise ID 20 included in the query 12. As such, only the subscription details 36 and enrichments 38 for the enterprise 22 is returned to the enterprise asset service 106.

At 406, the enterprise asset service 106 filters the subscription details 36 further to ensure that the enterprise user 104 has access to the enterprise subscriptions 32. One example of filtering performed by the enterprise asset service 106 includes comparing the security groups and/or domain levels to the access permissions included in the subscription details 36 for each enterprise subscription 32. If a match occurs between the security groups and/or domain levels of the user with the access permissions, the user has access to the enterprise subscription 32. If a match does not occur between the security groups and/or domain levels and the access permissions, the user is unable to access the enterprise subscription 32.

At 408, the enterprise asset service 106 separates the enterprise subscriptions 32 based on the filtering performed by the enterprise asset service 106. The set of metadata (e.g., subscription provider, subscription URL, processed URL, URL matching scheme, and/or additional sign-in parameters) for all the valid enterprise subscriptions 32 are returned and the enterprise asset service 106 separates the enterprise subscriptions 32 based on the metadata for the enterprise subscriptions 32. For example, the enterprise asset service 106 identifies the set of metadata for the enterprise subscriptions 32 the enterprise user 104 may access and divides the enterprise subscriptions 32 under separate keys, to signify the different types of URL matching schemes, and the enterprise subscriptions 32 which fall under that URL matching scheme.

At 410, the enterprise asset service 106 sets a cache response time with the separated enterprise subscriptions 32 and the enrichments 38 for the enterprise subscriptions 32. The enterprise asset service 106 is configured to support the browser side caching, for a predetermined period (e.g., one month).

At 412, the enterprise asset service 106 returns access controlled enterprise assets. The enterprise asset service 106 may return access controlled enterprise assets 30 to the browser 10 (e.g., the enterprise assets 30 available to the enterprise user 104). The enterprise asset service 106 may send the search response, the separated enterprise subscriptions 32, and the enrichments 38 with the metadata for the enterprise subscriptions to the browser cache 40. The browser 10 may store the separated enterprise subscriptions 32 and the enrichments 38 with the metadata based on the enterprise user 104. As such, different user accounts may have different information stored in the browser cache 40 for the enterprise subscriptions 32. The caching is automatically supported by the browser 10, and additional implementation is not needed to create, query, and/or delete the cache at the browser 10. As such, the browser 10 interacting with the cache 40 will appear transparent to the processes on the browser 10. The enterprise subscriptions 32 and the enrichments 38 remain in the cache 40 on the browser 10 for the predetermined response time.

As such, the method 400 is used to identify the enterprise subscriptions 32 to present with web search results based on the enterprise subscriptions 32 available for the enterprise 22 and/or available for access to the enterprise user 104.

Figure 5:
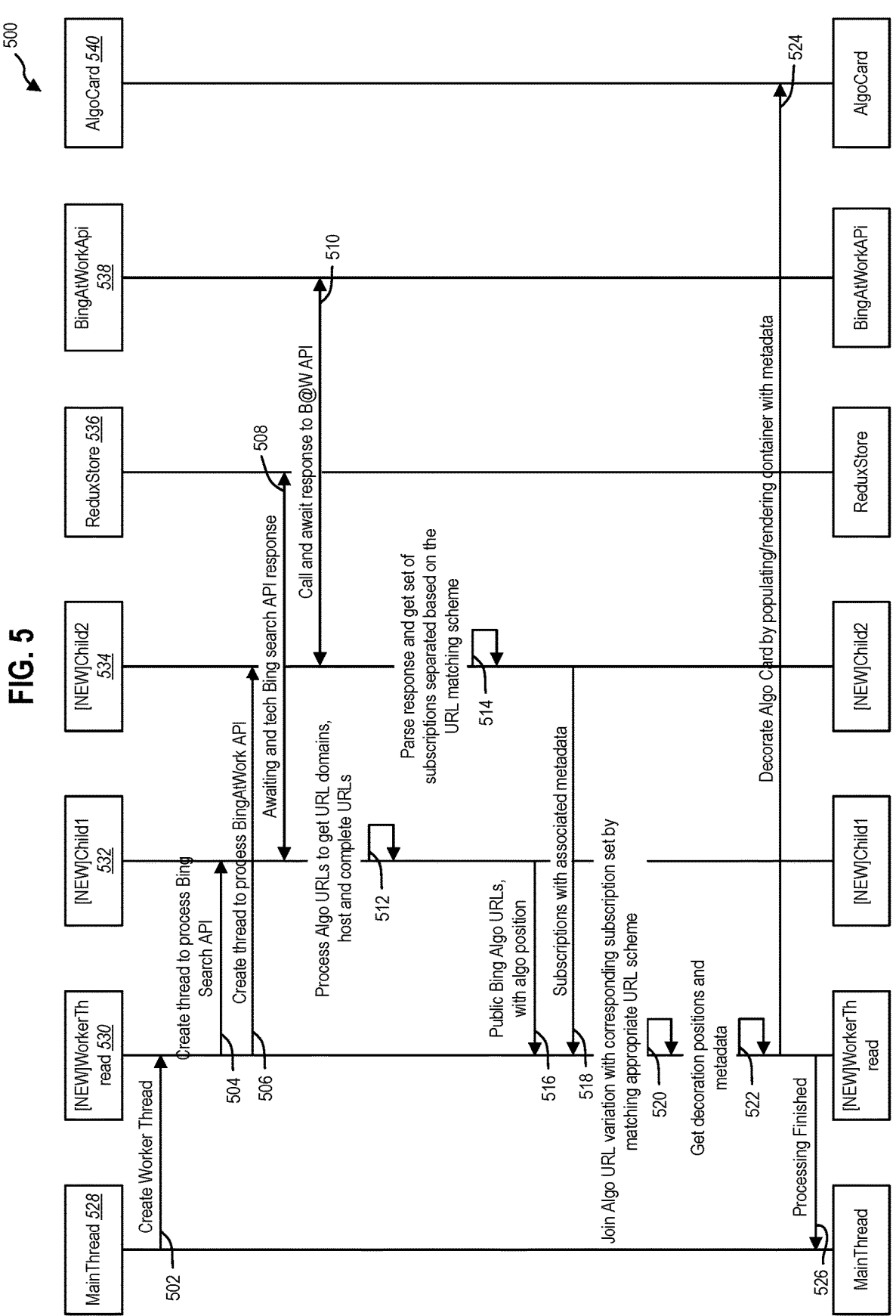
FIG. 5 illustrates an example method for determining an enterprise subscription to present with web search results in accordance with implementations of the present disclosure.

Referring now to FIG. 5, illustrated is an example method 500 for presenting an enterprise subscription 32 with web search results 28. The method 500 may be performed by a browser 10. The actions of method 500 may be discussed below in reference to the architecture of FIG. 1.

A 502, when a user query 12 is made at the browser 10, the presentation component 24 of the browser 10, spawns from a main thread 528 a web-broadcasting non-blocking worker thread, which in turn spawns two threads. At 504, the new worker thread 530 creates a thread and a new child 532 to process the redux store to obtain the public search API response (failure or success, and the search results in case of success). At 506, the new worker thread 530 also creates a thread and a new child 534 to process the enterprise asset service 106 to obtain the corpus of valid enterprise subscriptions 32 for the enterprise user 104.

At 508, the child 532 fetches the search API response with the search results from the redux store 536. For example, the search API response is used to obtain the top ten results for the query 12.

At 510, the child 534 concurrently makes a call to the enterprise asset service 106 to obtain the corpus of valid enterprise subscriptions 32 for the current enterprise user 104. Though this call is made on every query 12 by the user, the response from the enterprise asset service 106 is cached by the browser 10, and the response is served directly from the cache 40 on the browser 10.

At 512, the child 532 processes the top ten results for the query 12 and the URLs are processed to obtain the corresponding domain, host, and complete URLs. At 514, the child 534 parses the enterprise subscriptions 32 for the enterprise user 104 and obtains the set of enterprise subscriptions 32 separated based on the URL matching scheme.

At 516, the child 532 returns the public search results with the top ten URLs and the position of the URLs to the worker thread 530. At 518, the child 534 returns the enterprise subscriptions 32 with and the enrichments 38 with the metadata to the worker thread 530.

At 520, the worker thread 530 processes the URLs of the public search results (e.g., the top ten URLs). Each of the URLs of the public search results is matched against the metadata (e.g., the URL match scheme) of the separated enterprise subscriptions corpus to determine the URLs to decorate with the enterprise subscription 32. For example, if a match occurs between a URL of the search results and the metadata for the enterprise subscription 32 (e.g., domain name match, host name match, or a full URL match), the URL is identified as a URL to decorate with the enterprise subscription 32. If a match does not occur between the URL of the search results and the metadata for the enterprise subscription 32, the URL is not identified as a URL to decorate with the enterprise subscription 32.

At 522, the worker thread 530 identifies the URLs of the search results to decorate with the enterprise subscription 32 and the enrichments 38 of the enterprise subscription 32.

At 524, the worker thread 530 sends the decorations to an algorithm card 540 to present with each of the identified URLs of the search results 28 with the enterprise subscription 32 and the enrichments 38. In some implementations, the worker thread 530 places a placeholder container at a predetermined position (e.g., top right position of the URL, lower left position of the URL, adjacent to the URL, above the URL, below the URL, etc.) of every algorithm card for each URL. If the algorithm card is to be populated (e.g., the URL is identified as matching the metadata of the enterprise subscription 32), the placeholder container is populated by the worker thread 530 with the appropriate icon, and the popup to be shown is filled with the appropriate metadata for the enterprise subscription 32. In some implementations, the worker thread 530 triggers a script, which modifies the relevant algorithm card, and re-renders the modified algorithm card, with the new container populated on the client side.

At 526, the worker thread 530 sends a notification to the main thread 528 that processing is finished and that the search results 28 and/or any decorated algorithm cards with the enterprise subscription 32 and the enrichments 38 for the enterprise subscriptions 32 are ready for presentation in response to the query 12 performed by the enterprise user 104.

As such, the method 500 may be used to enhance the search results 28 for a query 12 with any relevant enterprise subscriptions 32 and the enrichments 38 for the enterprise subscriptions 32 so that an enterprise user 104 may identify which enterprise subscriptions 32 the user may access.

Figure 6:
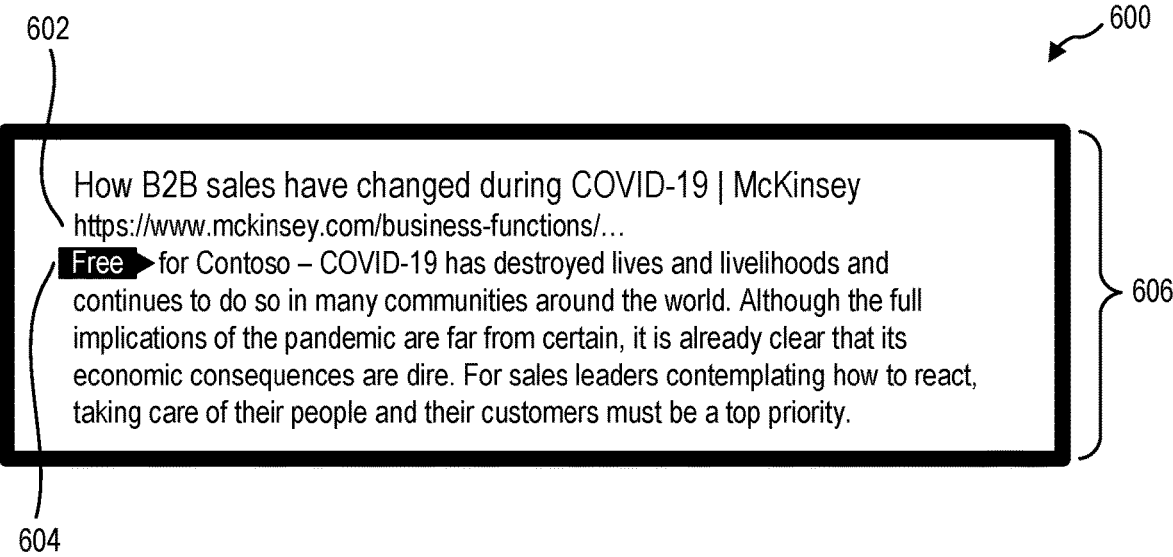
FIG. 6 illustrates an example graphical user interface of a webpage displaying a search result and an enterprise subscription identified in a badge in accordance with implementations of the present disclosure.

Referring now to FIG. 6, illustrated is an example graphical user interface (GUI) a webpage 600 displaying a search engine result 606 in response to a query 12 entered by the enterprise user 104 and an enterprise subscription 32 identified in a badge 604. The badge 604 highlights to the enterprise user 104 the search results URL 602 comes from a domain with an available enterprise subscription 32. The badge 604 may be provided for presentation with the search results 606 as discussed in the method 500. The badge 604 may be one of many decorations that may be added to the webpage 600 to indicate that an enterprise subscription 32 is available to the enterprise user 104. For example, the decorations may include an overlay or banner. The webpage 600 enriches the search results 28 by highlighting the enterprise subscriptions 32 available to the enterprise user 104 related to the query 12.

Figure 7:
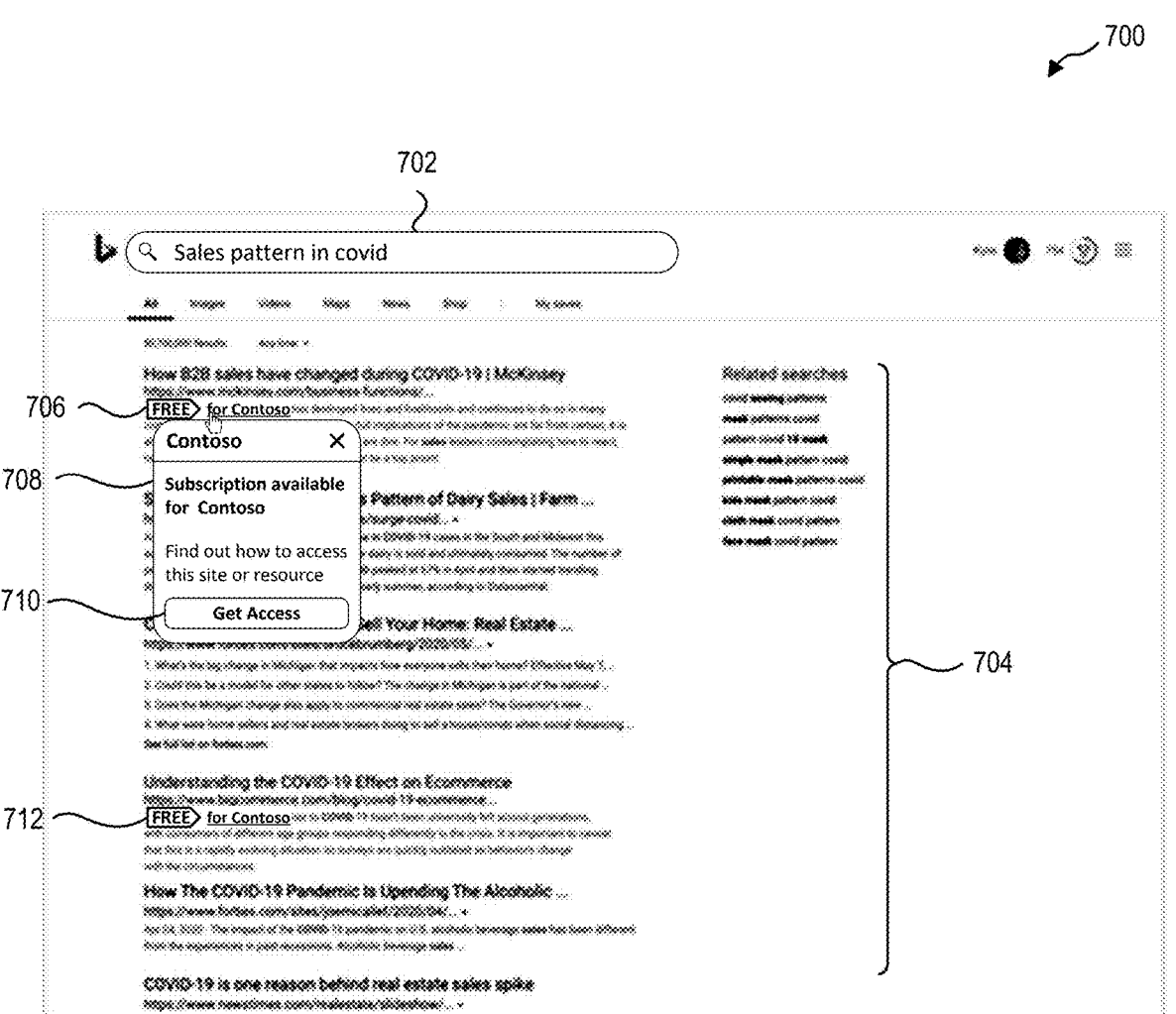
FIG. 7 illustrates an example graphical user interface of a webpage displaying a search result and an enterprise subscription in an overlay on the webpage in accordance with implementations of the present disclosure.

Referring now to FIG. 7 illustrated is an example GUI of a webpage 700 displaying a search results 704 for a query 702 and two badges 706, 712 that identify two of the URLs included in the search results 704 that have an enterprise subscription 32 available to the enterprise user 104. The badges 706, 712 may be provided for presentation with the search results 704 as discussed in the method 500. The badges 706, 712 may be one of many decorations that may be added to the webpage 700 to indicate that an enterprise subscription 32 is available to the enterprise user 104. For example, the decorations may include an overlay or other visually distinct display attribute to offset the enterprise subscriptions 32 from the search results 704.

The enterprise user 104 may hover over the decoration (e.g., the badge 706) and an overlay 708 or pop up notification is shown on the webpage 700 notifying the enterprise user 104 of the enterprise subscription 32. In some implementations, the enterprise user 104 may click on the "Get Access" link 710 to view information for accessing the enterprise subscription 32. In some implementations, the enterprise user 104 may click on the "Get Access" link 710 and the enterprise user 104 may be directly taken to the enterprise subscription 32. The enrichments 38 associated with the enterprise subscription 32 may be used to automatically login to the enterprise subscription 32. In addition, a single sign in from the user's work account may be used to automatically login to the enterprise subscription 32. The webpage 700 may enhance the search results 704 for a query 702 with information about the available enterprise subscriptions 32 related to the URLs identified in the search results 704 and provide access to the available enterprise subscriptions 32.

Figure 8:
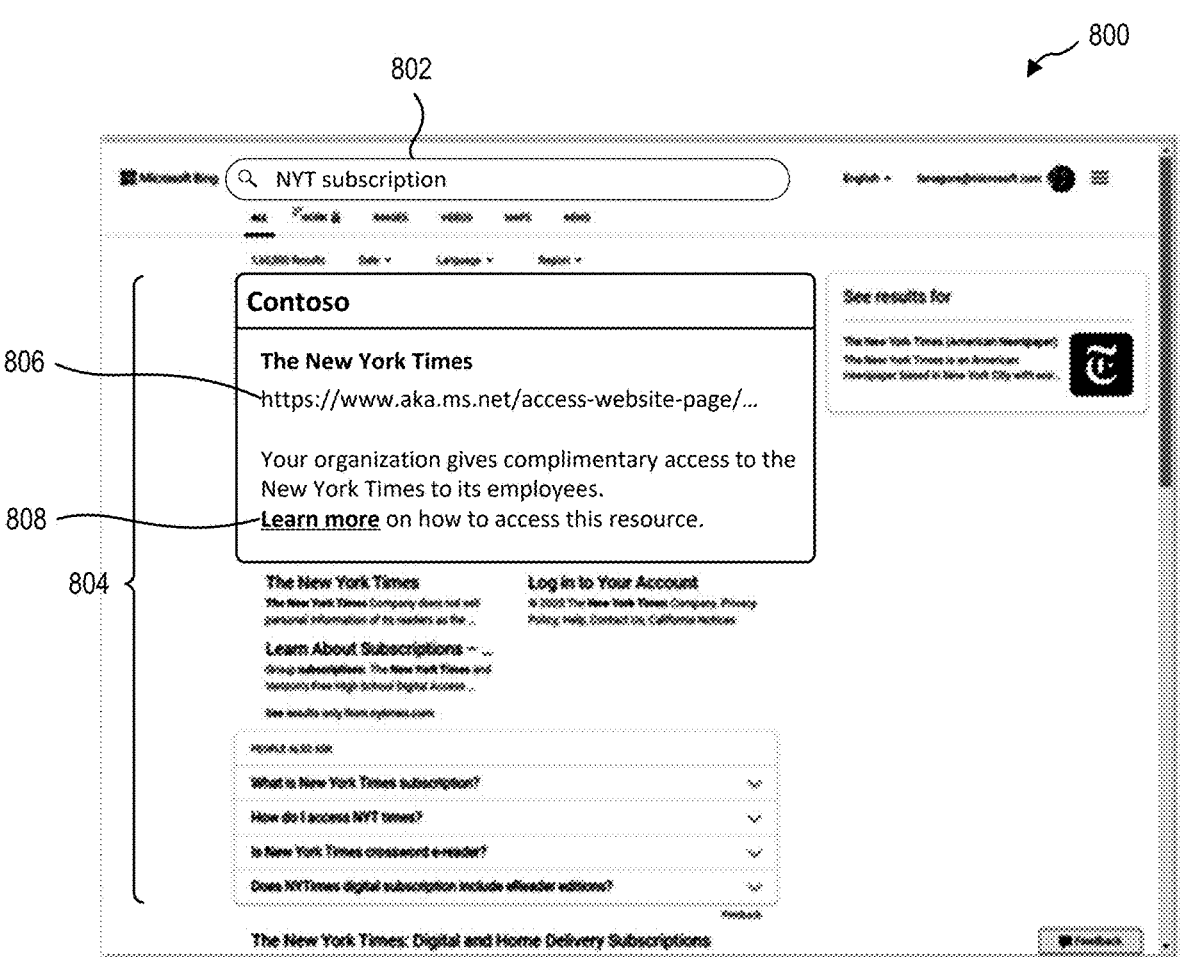
FIG. 8 illustrates an example graphical user interface of a webpage displaying a search result and an enterprise subscription in an overlay on the webpage in accordance with implementations of the present disclosure.

Referring now to FIG. 8, illustrated is an example GUI of a webpage 800 displaying search results 804 for a query 802 and an overlay 806 with the available enterprise subscription 32 related to the search results 804. The overlay 806 may be placed on the webpage 800 with a boundary to visually distinguish the enterprise subscription information from the search results 804. In addition, the overlay 806 may be placed above the search results 804. The enterprise user 104 may click on the "learn more" link 808 to view additional information about the enterprise subscription 32 or for accessing the enterprise subscription 32.

The query 802 may be determined to be a high intent query where the intent of the enterprise user 104 is to access a URL of the enterprise subscription. For example, the query 802 is for "New York Times Subscription" and the enterprise 22 may have a subscription available to the New York Times for employees of the enterprise 22. Key words from the query 802 may be used to determine the intent of the query 802. The webpage 800 may enhance the search results 804 by providing access to an available enterprise subscription 32 that is determined to the intent of the query 802.

Referring now to FIG. 9, illustrated is an example method 900 for identifying enterprise offers 34 from third parties related to search results 28. The method 900 may be performed by the enterprise asset service 106. The actions of method 900 may be discussed in reference to the architecture of FIG. 1.

At 902, the method 900 includes receiving the enterprise offers 34 available from third parties that have partnered with the environment 100. Enterprise offers 34 may include discounts or benefits that third parties provide to enterprise users 104 of the enterprise 22.

At 904, the method 900 includes receiving enriched information for the enterprise offers 34. The enriched information for the enterprise offers 34 may include rankings that determine how relevant the enterprise offers 34 are to different search results 28.

At 906, the method 900 includes receiving an enterprise ID 20 and a third party ID. The enterprise ID 20 may identify the enterprise 22 associated with the enterprise user 104 performing query 12. The enterprise ID 20 may be identified from a user account for the enterprise user 104. The third party ID may identify the third parties that the enterprise 22 is partnered with to provide enterprise offers 34.

At 908, the method 900 includes mapping for the enterprise ID 20 and the available enterprise offers 34 from each third party. Different organizations may have different enterprise offers 34 from the same third party.

At 910, the method 900 includes storing the mappings between the enterprise ID and the enterprise offers 34 in the datastore 118. The datastore 118 may store the available enterprise offers 34 for each enterprise 22 in a secure manner so that only the enterprise 22 has access to the data for the enterprise 22.

At 912, the method 900 includes receiving a query 12 for a topic from an enterprise user 104 using a search engine 114. The query 12 may identify an enterprise ID 20 of the enterprise user 104. The enterprise asset service 106 may receive the query 12 from a browser 10.

At 914, the method 900 includes performing a check to verify whether enterprise ID 20 has any mappings to enterprise offers 34. The enterprise asset service 106 may perform a search upon receiving the query 12 to determine whether the enterprise ID 20 has any mappings to enterprise offers 34.

At 916, the method 900 includes receiving a confirmation with the enterprise offers 34 available for the enterprise ID 20. The enterprise asset service 106 may determine the available enterprise offers 34 for the query 12. For example, the enterprise asset service 106 may use the enriched information associated with the enterprise offers 34 to determine whether the enterprise offers 34 are related to the query 12.

At 918, the method 900 includes providing ranked results of the enterprise offers 34 for presentation with the search results 28. If the enriched information for the enterprise offers 34 indicates that the third party offers are related to the query 12, the enterprise asset service 106 may provide the ranked enterprise offers 34 to the browser 10 for presentation with the search results 28.

As such, the method 900 may be used to identify one or more enterprise offers 34 related to the query 12 the enterprise user 104 is performing.

Figure 10:
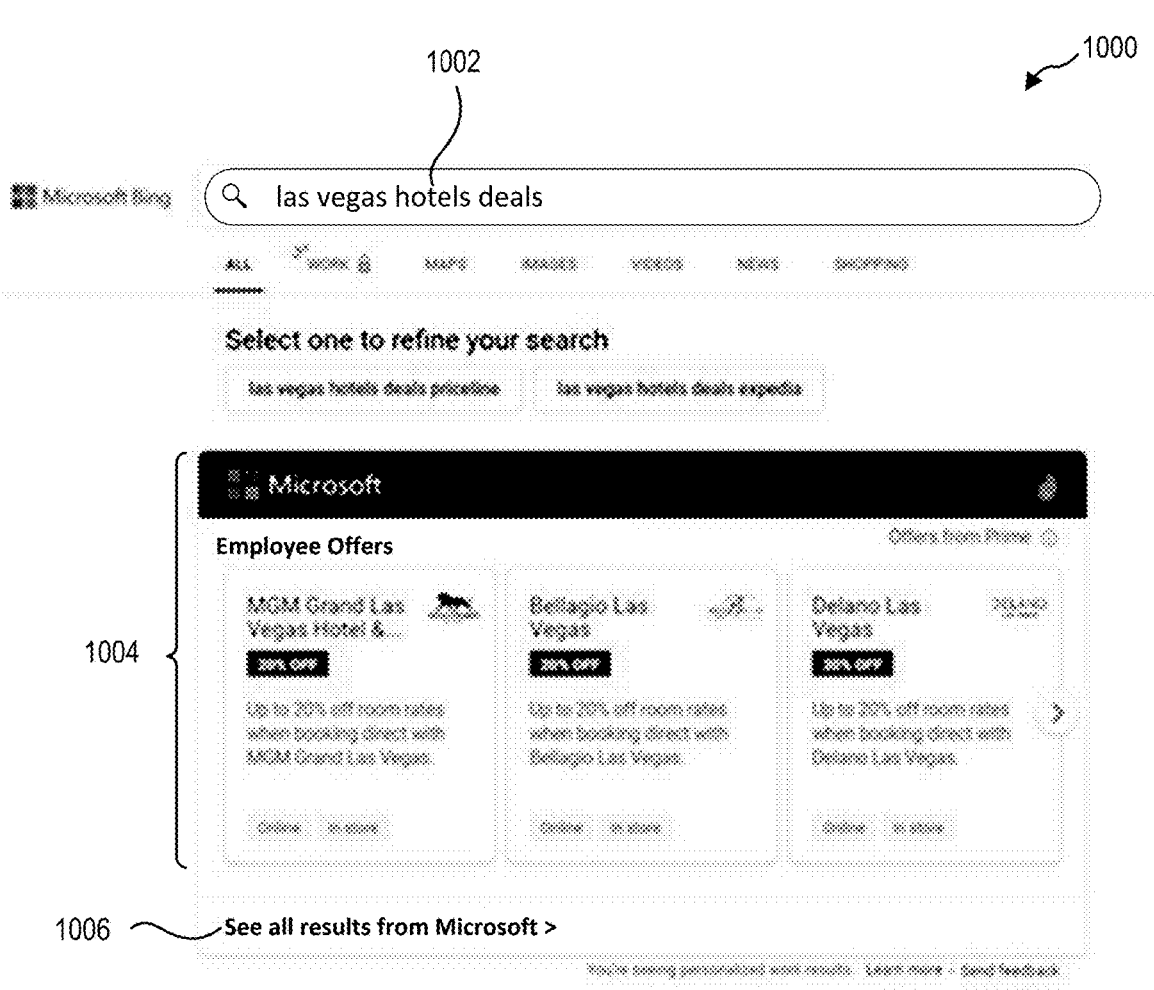
FIG. 10 illustrates an example graphical user interface of a webpage displaying enterprise offers in accordance with implementations of the present disclosure.

Referring now to FIG. 10, illustrated is an example GUI of a webpage 1000 displaying enterprise offers 1004 related to a query 1002. The webpage 1000 may present the enterprise offers 1004 in an overlay or cascade that a user may scroll through to see the available enterprise offers 1004.

The enterprise offers 1004 may be visually distinct from the search results 28 displayed on the webpage 1000. The webpage 1000 may have a link 1006 the enterprise user 104 may select to expand the search results 28 for the query 1002.

For example, the query 1002 is for "Las Vegas hotel deals." The enterprise asset service 106 may determine that the enterprise ID 20 has third party offers for Las Vegas hotel discounts. As such, the enterprise asset service 106 may provide the ranked results of the third party offers (e.g., discounts on hotels in Las Vegas) for presentation on the webpage 1000. The browser 10 may determine that the ranked result of the enterprise offers 34 are the best results for the query 1002 (e.g., highly relevant to the intent of the query 1002) to showcase to the enterprise user 104. The browser 10 may present the enterprise offers 1004 on the webpage 1000 with the search results 28 collapsed.

Referring now to FIG. 11, illustrated is an example GUI of a webpage 1100 displaying search results 1106, advertisements 1104, and enterprise offers 1108 for a query 1102. An enterprise user 104 may provide a query 1102 for "laptop deals" in a search engine 114. The enterprise asset service 106 may determine that the enterprise ID 20 for the enterprise user 104 has the enterprise offers 1108 for laptops from various third parties. The enterprise asset service 106 may provide a ranked results of the enterprise offers 1108 to the browser 10 indicating that the enterprise offers 1108 are available and are relevant to the query 1102.

The browser 10 may receive the ranked results of the enterprise offers 1108 and may determine that other advertisements 1104 are the best results to provide to the enterprise user 104 and may provide the advertisements 1104 first on the webpage 1100 with the search results 1106 and the enterprise offers 1108 below the advertisements 1104.

The browser 10 may use a variety of factors in determining the best results for the query 1102 and the placement of the enterprise offers 1108 on the webpage 1100. Example factors include, but are not limited to, available content from local businesses, available advertisements, the intent of the query 1102, and/or the relevance of the enterprise offers 1108 to the query 1102.

The browser 10 may also use the variety of factors in determining whether to collapse the enterprise offers 1108 or expand the enterprise offers 1108. For example, if the enterprise asset service 106 indicates a low confidence that the enterprise offers 1108 are relevant to the enterprise offers 1108, the browser 10 may collapse the enterprise offers 1108 on the webpage 1100 and a user may select a link to expand the available enterprise offers 1108. If the enterprise asset service 106 indicates a high confidence that the enterprise offers 1108 are relevant to the enterprise offers 1108, the browser 10 may expand the enterprise offers 1108 and/or place the enterprise offers 1108 higher on the webpage 1100.

Referring now to FIG. 12, illustrated is an example method 1200 for presenting enterprise assets 30 with search results 28. The actions of the method 1200 may be discussed in reference to the architecture of FIG. 1.

At 1202, the method 1200 includes receiving a query from a user. The enterprise user 104 may enter one or more queries 12 on a search webpage 26 presented on a display 116 in communication with the device 102. The enterprise users 104 may provide text or other inputs for the queries 12. The enterprise users 104 may access the device 102 using a user account 16 (e.g., a work account or organization account). The user account 16 may identify the user identification (ID) 18, any security groups that the enterprise user 104 may be part of in the enterprise 22, the enterprise identification (ID) 20 for the enterprise 22, and/or any additional information for the enterprise user 104. The query 12 may be associated with the user account 16, and thus, may identify the enterprise user 104 and/or the enterprise 22 of the user account 16.

At 1204, the method 1200 includes obtaining an identifier for the user. In some implementations, the browser 10 obtains the user ID 18 from the user account 16 associated with the query 12. In some implementations, the enterprise asset service 106 obtains the user ID 18 from the user account 16 associated with the query 12.

At 1206, the method 1200 includes querying one or more enterprise databases to obtain enterprise asset information based on the identifier. For example, the enterprise asset information includes the available enterprise assets 30. The enterprise asset information may also include access information for the enterprise assets 30. In some implementations, the browser 10 may use the user ID 18 to query an enterprise database (e.g., the cache 40) to identify the enterprise assets 30 available for the enterprise user 104. For example, different enterprise assets 30 may be available to the enterprise user 104 based on permissions associated with or provided to the user ID 18 (e.g., different security groups or domain levels may be associated with the user ID 18). In some implementations, the enterprise asset service 106 queries one or more enterprise databases (e.g., datastores 112, 118) to obtain enterprise asset information (e.g., enterprise assets 30) for the enterprise 22 of the enterprise user 104. The enterprise asset service 106 may use the user ID 18 associated with the query 12 to identify the enterprise assets 30 available in the datastores 112, 118 for the enterprise user 104 and may provide the obtained enterprise asset information to the browser 10.

At 1208, the method 1200 includes providing the query to a search engine. The device 102 may provide the queries 12 for the topics 14 to a search engine 114 via a network.

At 1210, the method 1200 includes receiving web search results from the search engine. The search engine 114 may execute the queries 12 against one or more datastores with a plurality of webpages to obtain search results 28 (e.g., web search results) for the queries 12. For example, the search results 28 may include one or more webpages and corresponding URLs that relate to the topics 14. The search engine 114 may provide the search results 28 to the device 102 for presentation on the display 116.

At 1212, the method 1200 includes enriching the search results with one or more enterprise assets related to the web search results. Enriching the search results 28 may include, but is not limited to, highlighting an availability of the enterprise assets 30, providing information for accessing the enterprise assets 30, or providing access to the enterprise assets 30. The presentation component 24 may receive the search results 28 and make a determination whether to present any enterprise assets 30 with the search results 28. In some implementations, the presentation component 24 uses the query 12 and/or the search results 28 to identify which enterprise assets 30 to include with the search results 28.

For example, the presentation component 24 accesses the cache 40 of the browser 10 and determines whether any of the URLs included in the search results 28 match the URLs included in the subscription details 36 of the enterprise subscriptions 32. A URL matching scheme may be used in determining whether a match occurs. The URL matching scheme may include matching a domain name, matching a host name, or matching a full URL. If a match occurs, the presentation component 24 may determine to decorate one or more URLs included in the search results 28 with the enterprise subscription 32 and the enterprise subscription 32 details or other information for accessing the enterprise subscription 32.

Another example may include the presentation component 24 determining whether any of the enterprise offers 44 are related to the search results 28. If the enterprise offers 44 are related to the search results 28, the presentation component 24 may determine to present the enterprise offers 44 with the search results 28.

At 1214, the method 1200 includes presenting a search webpage with the search results and the one or more enterprise assets. For example, the presentation component 24 merges the enterprise assets 30 with the search results 28 on the search webpage 26. The presentation component 24 may place the enterprise assets 30 on the search webpage 26 based on a variety of factors. Example factors include, but are not limited to, the intent of the query 12, available content from local businesses, available advertisements, and/or the relevance of the enterprise assets 30 to the query. The presentation component 24 may use the variety of factors in determining whether to collapse the enterprise assets 30, expand the enterprise assets 30 by providing more information. In addition, the presentation component 24 may use the variety of factors in determining whether to place the enterprise assets 30 higher or lower in the search webpage 26. The enterprise assets 30 may have visually distinct display attributes (e.g., different border, different shading, overlays).

The presentation component 24 may provide access to the one or more enterprise assets 30. For example, the enterprise user 104 may click on the enterprise offer 34 that appears as a carousel in the search webpage 26 and the selected offer may open directly. As such, the enterprise user 104 may not miss any relevant deals if something matches with the query 12. Another example may include the presentation component 24 redirecting the enterprise user 104 to another page with information for accessing the enterprise assets 30. Another example includes the presentation component 24 automatically providing the enterprise user 104 access to the enterprise subscriptions 32 based on the user account 16 for the enterprise user 104. The presentation component 24 may modify a URL in the search results 28 to redirect the enterprise user 104 to a login page for the enterprise subscription 32 and may automatically sign in the enterprise user 104 to the enterprise subscription 32 using the user account 16.

As such, the method 1200 may be used to highlight enterprise assets 30 related to the query 12 so that the enterprise user 104 may easily identify the available enterprise assets 30.

Figure 13:
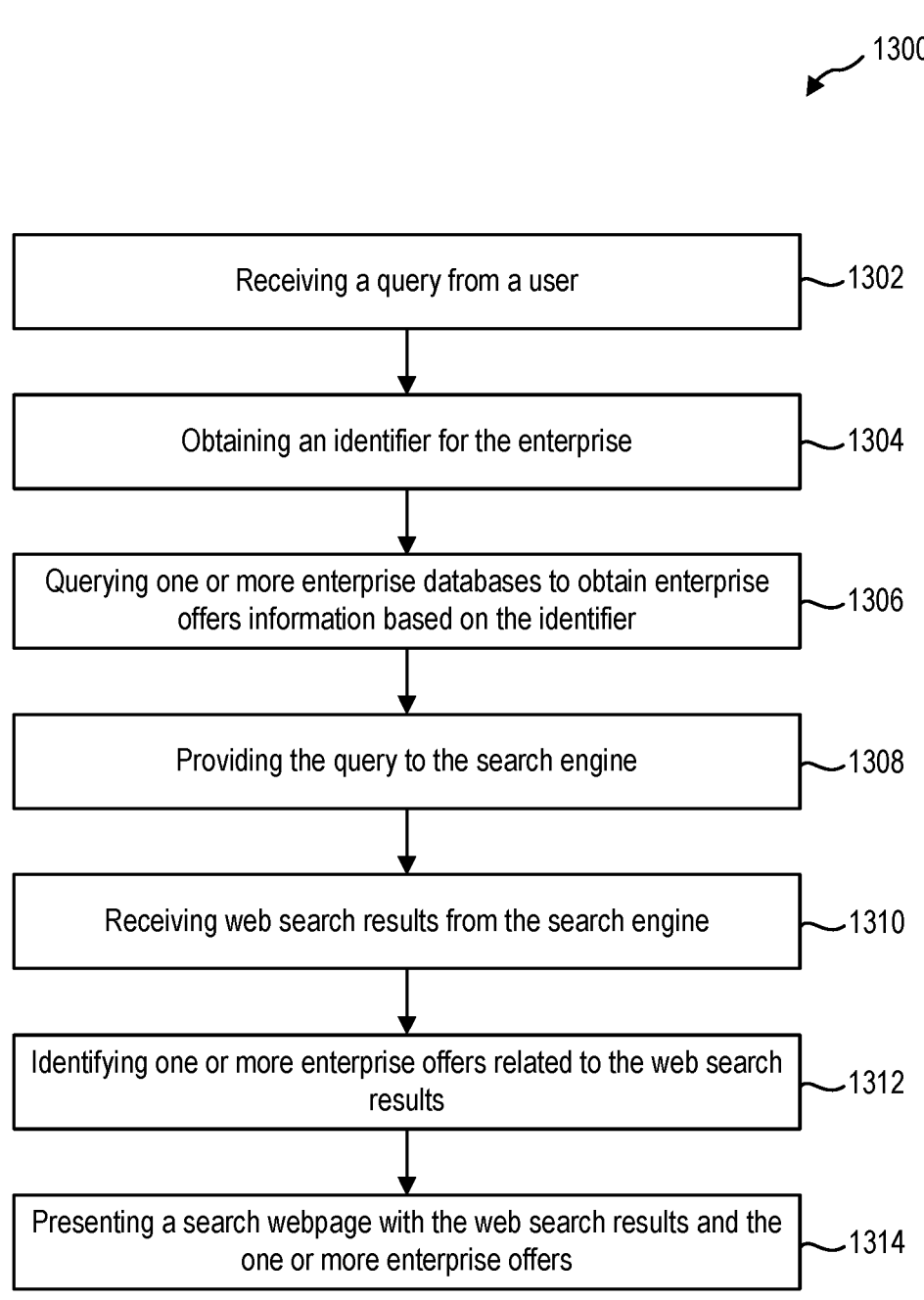
FIG. 13 illustrates an example method for presenting enterprise offers with search results in accordance with implementations of the present disclosure.

Referring now to FIG. 13, illustrated is an example method 1300 for presenting enterprise offers 34 with search results 28. The actions of the method 1300 may be discussed in reference to the architecture of FIG. 1.

At 1302, the method 1300 includes receiving a query from a user. The enterprise user 104 may enter one or more queries 12 on a search webpage 26 presented on a display 116 in communication with the device 102. The enterprise users 104 may provide text or other inputs for the queries 12. The enterprise users 104 may access the device 102 using a user account 16 that provides user information, such as, the user identification (ID) 18, any security groups that the enterprise user 104 may be part of in the enterprise 22, and/or the enterprise identification (ID) 20 for the enterprise 22. The query 12 may be associated with the user account 16 and the query 12 may identify the enterprise user 104 and/or the enterprise 22 associated with the user account 16.

At 1304, the method 1300 includes obtaining an identifier for the enterprise. In some implementations, the browser 10 obtains the enterprise ID 20 from the user account 16 associated with the query 12. In some implementations, the enterprise asset service 106 obtains the enterprise ID 20 from the user account 16 associated with the query 12.

At 1306, the method 1300 includes querying one or more enterprise databases to obtain enterprise offers information based on the identifier. The enterprise offers information may include the available enterprise offers 34 for the enterprise 22. The enterprise offers information may also include the third party providers of the enterprise offers 34. In some implementations, the browser 10 may use the enterprise ID 20 associated with the query 12 to identify the enterprise offers 34 available in the enterprise database (e.g., cache 40) for the enterprise 22. In some implementations, the enterprise asset service 106 queries one or more enterprise databases (e.g., datastores 118) to obtain enterprise offers information for the enterprise 22. In some implementations, the enterprise asset service 106 may use the enterprise ID 20 associated with the query 12 to identify the available enterprise offers 34 in the datastore 118 for the enterprise 22 and may provide the obtained enterprise offer information to the browser 10 to store, for example, in the cache 40.

At 1308, the method 1300 includes providing the query to a search engine. The device 102 may provide the queries 12 for the topics 14 to a search engine 114 via a network.

At 1310, the method 1300 includes receiving web search results from the search engine. The search engine 114 may execute the queries 12 against one or more datastores with a plurality of webpages to obtain search results 28 (e.g., web search results) for the queries 12. For example, the search results 28 may include one or more webpages and corresponding URLs that relate to the topics 14. The search engine 114 may provide the search results 28 to the device 102 for presentation on the display 116.

At 1312, the method 1300 includes identifying one or more enterprise offers related to the web search results. The presentation component 24 determining whether any of the enterprise offers 34 are related to the search results 28. If the enterprise offers 44 are related to the search results 28, the presentation component 24 may determine to present the enterprise offers 34 with the search results 28. In some implementations, the presentation component 24 uses the topics 14 and/or the keywords from the query 12 to identify which enterprise offers 34 to include with the search results 28. For example, if the enterprise offers 34 are related to the intent of the query 12 determined by the keywords and/or the topics 14, the presentation component 24 may determine to present the enterprise offers 34. In addition, if the enterprise offers 34 are related to the keywords or the topics 14, the presentation component 24 may determine to present enterprise offers 34.

At 1314, the method 1300 includes presenting a search webpage with the web search results and the one or more enterprise offers. The presentation component 24 may place the enterprise offers 34 on the search webpage 26 based on a variety of factors. Example factors include, but are not limited to, the intent of the query 12, available content from local businesses, available advertisements, and/or the relevance of the enterprise assets 30 to the query. The presentation component 24 may use the variety of factors in determining the placement of the enterprise offers 34 on the search webpage 26. The enterprise offers 34 may be placed at a top portion of the search webpage 26 with the search results 28 below the enterprise offers 34. The enterprise offers 34 may be placed at a bottom portion of the search webpage 26 with the search results 28 above the enterprise offers 34. The enterprise offers 34 may be placed adjacent to or next to the search results 28.

The presentation component 24 may receive enriched information for the enterprise offers 34 that includes rankings 46 for the enterprise offers 34. The rankings 46 may indicate a relevance level of the enterprise offers 34 to different search results 28. The presentation component 24 may use the rankings 46 to determine a position of the enterprise offers 34 on the search webpage 26. For example, the presentation component 24 may place the enterprise offers 34 a position at a top portion of the search webpage 26 with the search results 28 for the query 12 presented below the enterprise offers 34 based on determining that the enterprise offers 34 are the better result for the query 12 relative to the search results 28. Another example includes the presentation component 24 placing the enterprise offers 34 in a position at a bottom portion of the search webpage 26 with the search results for the query 12 presented above the enterprise offers 34 based on determining that the search results 28 are the better result for the query 12 relative to the enterprise offers 34.

As such, the presentation component 24 may use a variety of factors in determining how to present the enterprise offers 34 on the search webpage 26. The enterprise offers 34 may have visually distinct display attributes (e.g., different border, different shading, overlays).

The method 1300 may be used to highlight available enterprise offers 34 related to a query 12 so that the enterprise users 106 may not miss any relevant deals if something matches with the query 12.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

INDUSTRIAL APPLICABILITY

The present disclosure is related to methods, systems, and devices for highlighting to the enterprise users the available enterprise assets through a web experience. The methods, systems, and devices may automatically identify available enterprise subscriptions for the enterprise and may present the available enterprise assets available in an overlay on the webpage, helping the enterprise users discover sources of information faster, and thereby, improving productivity.

The methods, systems, and devices enable users to discover the enterprise assets (e.g., subscriptions, discounts, offers) available related to the enterprise users' search results. The systems receive the enterprise context (e.g., an enterprise identification (ID)), and based on the enterprise ID, the corpus of enterprise assets available to the enterprise user is filtered and retrieved. Further filtering is performed based on the security groups and/or domain levels the user is a part of in the enterprise. The set of metadata for all the valid subscriptions are returned.

The results are divided under separate keys, to signify the different types of URL matching schemes, and the subscriptions which fall under that URL matching scheme.

When a user query is made, the user interface spawns a web-broadcasting non-blocking worker thread, which in turn spawns two threads. The first worker thread probes the redux store to obtain the public search results. The search results are used to obtain the top ten results for the query, and the URLs are processed to obtain the corresponding domain, host and complete URLs. Simultaneously, in the second worker thread makes a call to an enterprise asset service is made to obtain the corpus of valid subscriptions for the current user. Though this call is made on every query, the response is cached by the browser, and the response is served directly from the cache. Each of the processed URLs is matched against the URL match scheme separated subscriptions corpus to determine the search results to be decorated with enterprise subscriptions.

The methods and systems also highlight to the enterprise user relevant offers available from the enterprise assets that may be related to the enterprise user's search results. The methods and systems integrate with third party providers and build a ranking and trigger engine that caters to a respective enterprise or organization.

One technical advantage of some implementations of the present disclosure is improving web search results by identifying and searching the private enterprise database in addition to the public search engine databases.

As such, the methods, systems, and devices are used to enrich web search results with enterprise assets that are available to the enterprise user through an association with the enterprise.

(A1) Some implementations include a method for presenting enterprise assets (e.g., enterprise assets 30) with search results (e.g., search results 28) on a display (e.g., display 116) of a device (e.g., device 102). The method includes receiving (1202) a query (e.g., query 12) from a user (e.g., enterprise user 104). The method includes obtaining (1204) an identifier (e.g., user ID 18) for the user. The method includes querying (1206) one or more enterprise databases (e.g., cache 40, datastores 112, 118) to obtain enterprise asset information based on the identifier. The method includes providing (1208) the query to a search engine (e.g., search engine 114). The method also includes, responsive to providing the query, receiving (1210) search results from the search engine. The method further includes enriching (1212) the search results with one or more enterprise assets related to the search results. The method includes presenting (1214) on the display a search webpage (e.g., search webpage 26) with the search results and the one or more enterprise assets.

(A2) In some implementations of the method of A1, enriching the search results includes, based on the obtained enterprise asset information, performing one or more of (i) highlighting an availability of the one or more enterprise assets, (ii) providing information for accessing the one or more enterprise assets, or (iii) providing access to the one or more enterprise assets.

(A3) In some implementations, the method of A1 or A2 includes using the query or the search results to identify the one or more enterprise assets to include on the search webpage and enriching the search results includes performing one or more of (i) highlighting an availability of the one or more enterprise assets, (ii) providing information for accessing the one or more enterprise assets, or (iii) providing access to the one or more enterprise assets.

(A4) In some implementations, the method of any of A1-A3 includes using the identifier to determine the one or more enterprise assets available to the user based on permissions provided to the user.

(A5) In some implementations of the method of any of A1-A4, the one or more enterprise assets include an enterprise subscription (e.g., enterprise subscription 32) and presenting the search webpage further includes providing information on the enterprise subscription and information for accessing the enterprise subscription.

(A6) In some implementations, the method of any of A1-A5 includes providing the user access to the enterprise subscription by modifying a uniform resource locator (URL) in the search results to redirect the user to a login page for the enterprise subscription and automatically sign in the user to the enterprise subscription using a user account (e.g., user account 16) for the enterprise user.

(A7) In some implementations of the method of any of A1-A6, the enterprise subscription is determined to be related to the search results by using a uniform resource locator (URL) matching scheme to compare URLs from the search results to a URL for the enterprise subscription to determine if a match occurs between the URLs from the search result and the URL for the enterprise subscription.

(A8) In some implementations of the method of any of A1-A7, the URL matching scheme includes one or more of matching a domain name, matching a host name, or matching a full URL.

(A9) In some implementations of the method of any of A1-A8, the one or more enterprise assets are visually distinct from display attributes of the search results.

(B1) Some implementations include a method for presenting enterprise offers (e.g., enterprise offers 34) with search results (e.g., search results 28) on a display (e.g., display 116) of a device (e.g., device 102). The method includes receiving (1302) a query (e.g., query 12) from a user (e.g., enterprise user 104). The method includes obtaining (1304) an identifier for the enterprise (e.g., enterprise 22). The method includes querying (1306) one or more enterprise databases to obtain enterprise offers information (e.g., enterprise offers 34) based on the identifier. The method includes providing (1308) the query to a search engine (e.g., search engine 114). The method includes responsive to providing the query, receiving (1310) search results. The method includes identifying (1312) one or more enterprise offers related to the search results. The method includes presenting (1314) on the display a search webpage (e.g., search webpage 26) with the search results and the one or more enterprise offers.

(B2) In some implementations of the method of B1, the one or more enterprise offers are visually distinct from display attributes of the search results.

(B3) In some implementations, the method of B1 or B2 includes determining a placement of the one or more enterprise offers on the search result webpage based on one or more factors that indicate whether the one or more enterprise offers are a better result for the query relative to the search results.

(B4) In some implementations of the method of any of B1-B3, the one or more enterprise offers are placed in a position at a top portion of the search result webpage with the search results for the query presented below the one or more enterprise offers based on determining that the one or more enterprise offers are the better result for the query relative to the search results.

(B5) In some implementations of the method of any of B1-B4, the one or more enterprise offers are placed in a position at a bottom portion of the search result webpage with the search results for the query presented above the one or more enterprise offers based on determining that the search results are the better result for the query relative to the one or more enterprise offers.

(B6) In some implementations, the method of any of B1-B5 includes receiving enriched information for the one or more enterprise offers, wherein the enriched information includes rankings that indicate a relevance level of the one or more enterprise offers to different search results; and using the enriched information to identify the one or more enterprise offers related to the search results.

Some implementations include a device (device 102). The device includes one or more processors; memory in electronic communication with the one or more processors; and instructions stored in the memory, the instructions being executable by the one or more processors to perform any of the methods described here (e.g., A1-A9, B1-B6).

Some implementations include a system (environment 100). The device includes one or more processors; memory in electronic communication with the one or more processors; and instructions stored in the memory, the instructions being executable by the one or more processors to perform any of the methods described here (e.g., A1-A9, B1-B6).

Some implementations include a computer-readable storage medium storing instructions executable by one or more processors to perform any of the methods described here (e.g., A1-A9, B1-B6).

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A method for presenting enterprise assets with internet search results on a display of a device, comprising:
   receiving a query from a user;
   obtaining an identifier for the user;
   querying one or more enterprise databases to obtain enterprise asset information based on the identifier;
   providing the query to a search engine to perform an internet search;
   responsive to providing the query, receiving internet search results from the search engine;
   enriching the internet search results with one or more enterprise assets related to the internet search results; and
   presenting on the display a search webpage with the internet search results and the one or more enterprise assets.

2. The method of claim 1, wherein enriching the internet search results includes:
   based on the obtained enterprise asset information, performing one or more of (i) highlighting an availability of the one or more enterprise assets, (ii) providing information for accessing the one or more enterprise assets, or (iii) providing access to the one or more enterprise assets.

3. The method of claim 1, further comprising:
   using the query or the internet search results to identify the one or more enterprise assets to include on the search webpage, wherein the one or more enterprise assets are visually distinct from display attributes of the internet search results; and
   wherein enriching the internet search results includes performing one or more of (i) highlighting an availability of the one or more enterprise assets, (ii) providing information for accessing the one or more enterprise assets, or (iii) providing access to the one or more enterprise assets.

4. The method of claim 1, further comprising:
   using the identifier to determine the one or more enterprise assets available to the user based on permissions provided to the user.

5. The method of claim 1, wherein the one or more enterprise assets include an enterprise subscription, and
   presenting the search webpage further includes providing information on the enterprise subscription and information for accessing the enterprise subscription.

6. The method of claim 5, further includes:
   providing the user access to the enterprise subscription by modifying a uniform resource locator (URL) in the internet search results to redirect the user to a login page for the enterprise subscription and automatically sign in the user to the enterprise subscription using a user account for the user.

7. The method of claim 5, wherein the enterprise subscription is determined to be related to the internet search results by using a uniform resource locator (URL) matching scheme to compare URLs from the internet search results to a URL for the enterprise subscription to determine if a match occurs between the URLs from the search result and the URL for the enterprise subscription, and
   wherein the URL matching scheme includes one or more of matching a domain name, matching a host name, or matching a full URL.

8. The method of claim 1, wherein the user has an association with an organization, wherein the enterprise assets made available by the organization to the user.

9. A method for presenting enterprise offers with search results on a display of a device, comprising:
   receiving a query from a user;
   obtaining an identifier for the enterprise;
   querying one or more enterprise databases to obtain enterprise offers information based on the identifier;
   providing the query to a search engine;
   responsive to providing the query, receiving search results;
   identifying one or more enterprise offers related to the search results; and
   presenting on the display a search webpage with the search results and the one or more enterprise offers.

10. The method of claim 9, further comprising:
   determining a placement of the one or more enterprise offers on the search webpage based on one or more factors that indicate whether the one or more enterprise offers are a better result for the query relative to the search results wherein the one or more enterprise offers are visually distinct from display attributes of the search results.

11. The method of claim 10, wherein the one or more enterprise offers are placed in a position at a top portion of the search webpage with the search results for the query presented below the one or more enterprise offers based on determining that the one or more enterprise offers are the better result for the query relative to the search results, or the one or more enterprise offers are placed in a position at a bottom portion of the search webpage with the search results for the query presented above the one or more enterprise offers based on determining that the search results are the better result for the query relative to the one or more enterprise offers.

12. The method of claim 9, further comprising:

receiving enriched information for the one or more enterprise offers, wherein the enriched information includes rankings that indicate a relevance level of the one or more enterprise offers to different search results; and using the enriched information to identify the one or more enterprise offers related to the search results.

13. A device, comprising:

one or more processors;

memory in electronic communication with the one or more processors; and instructions stored in the memory, the instructions executable by the one or more processors to:

receive a query from a user;

obtain an identifier for the user;

query one or more enterprise databases to obtain enterprise asset information based on the identifier, wherein the identifier includes a uniform resource locator (URL) for an enterprise subscription;

provide the query to a search engine;

responsive to providing the query, receive search results from the search engine;

enrich the search results with one or more enterprise assets related to the search results by using a URL matching scheme to compare URLs from the search results to the URL for the enterprise subscription; and present on a search webpage the search results and the one or more enterprise assets.

14. The device of claim 13, wherein the instructions are further executable by the one or more processors to enrich the search results based on the obtained enterprise asset information by performing one or more of (i) highlighting an availability of the one or more enterprise assets, (ii) providing information for accessing the one or more enterprise assets, or (iii) providing access to the one or more enterprise assets.

15. The device of claim 13, wherein the one or more enterprise assets are visually distinct from display attributes of the search results and the one or more enterprise assets include an enterprise subscription or an enterprise offer.

16. The device of claim 13, wherein the instructions are further executable by the one or more processors to determine that the one or more enterprise assets are related to the search results by comparing the one or more enterprise assets to the search results.

17. The device of claim 13, wherein the instructions further comprise:

using the query or the search results to identify the one or more enterprise assets to include on the search webpage, wherein the one or more enterprise assets are visually distinct from display attributes of the search results; and wherein enriching the search results includes performing one or more of (i) highlighting an availability of the one or more enterprise assets, (ii) providing information for accessing the one or more enterprise assets, or (iii) providing access to the one or more enterprise assets.

18. The device of claim 17, wherein the instructions further comprise:

using the identifier to determine the one or more enterprise assets available to the user based on permissions provided to the user.

19. The device of claim 18, wherein the one or more enterprise assets include an enterprise subscription, and wherein the instructions further comprise presenting the search webpage further includes providing information on the enterprise subscription and information for accessing the enterprise subscription.

20. The device of claim 19, wherein the instructions further includes:

providing the user access to the enterprise subscription by modifying a uniform resource locator (URL) in the search results to redirect the user to a login page for the enterprise subscription and automatically sign in the user to the enterprise subscription using a user account for the user.

21. The device of claim 19, wherein the enterprise subscription is determined to be related to the search results by using a uniform resource locator (URL) matching scheme to compare URLs from the search results to a URL for the enterprise subscription to determine if a match occurs between the URLs from the search result and the URL for the enterprise subscription, and wherein the URL matching scheme includes one or more of matching a domain name, matching a host name, or matching a full URL.

* * * * *